(12) United States Patent
Hersans

(10) Patent No.: US 10,594,490 B2
(45) Date of Patent: Mar. 17, 2020

(54) FILTERING ENCRYPTED DATA USING INDEXES

(71) Applicant: salesforce.com, inc., San Francisco, CA (US)

(72) Inventor: Alexandre Hersans, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 116 days.

(21) Appl. No.: 15/495,685

(22) Filed: Apr. 24, 2017

(65) Prior Publication Data

US 2018/0307763 A1    Oct. 25, 2018

(51) Int. Cl.
*H04L 9/32*    (2006.01)
*G06F 16/22*   (2019.01)

(52) U.S. Cl.
CPC ........ *H04L 9/3242* (2013.01); *G06F 16/2228* (2019.01); *H04L 9/3236* (2013.01)

(58) Field of Classification Search
CPC ......... G06F 21/6218; G06F 2221/2107; G06F 21/6209; G06F 16/2228; H04L 9/3242; H04L 9/3236
See application file for complete search history.

(56) References Cited

U.S. PATENT DOCUMENTS

| | | | |
|---|---|---|---|
| 2006/0085651 A1* | 4/2006 | Staddon | G06F 21/6227 713/193 |
| 2011/0040806 A1* | 2/2011 | Lee | G06F 17/30342 707/809 |
| 2012/0269340 A1* | 10/2012 | Stu | H04L 9/0822 380/28 |
| 2015/0154418 A1* | 6/2015 | Redberg | G06F 17/30106 713/165 |
| 2016/0344553 A1* | 11/2016 | Chen | G06F 11/14 |
| 2017/0288858 A1* | 10/2017 | Hirano | G06F 17/3033 |

* cited by examiner

*Primary Examiner* — Ali S Abyaneh
(74) *Attorney, Agent, or Firm* — Holland & Hart LLP

(57) ABSTRACT

During an encryption process, a database system may generate an index value based on the plaintext to be encrypted, an encryption key, a data field-specific salt, or a combination thereof. The database may store the index value in an index associated with the ciphertext output of the encryption process. In some cases, the database may receive a query specifying a plaintext value for filtering on a data field, where the database may return data objects with the specified plaintext value in the given data field. The database may compute a set of index values associated with the specified plaintext, and may identify indexes with index values included in the set of index values and associated with the given data field. The database may decrypt the ciphertexts associated with the identified indexes to check if they match the specified plaintext.

17 Claims, 12 Drawing Sheets

FILTERING ENCRYPTED DATA USING INDEXES

FIELD OF TECHNOLOGY

The present disclosure relates generally to database systems and data processing, and more specifically to filtering encrypted data using indexes.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may include one or more databases for storing or analyzing data. The data may be encrypted at rest in a database for added security or to satisfy data compliance requirements. However, encrypting the data may reduce some database functionality such as querying, filtering, or ordering the data.

DETAILED DESCRIPTION

A cloud platform may use one or more databases to store sensitive, confidential, or proprietary data. In some cases, a database may store large amounts of data (e.g., hundreds of millions of rows) belonging to multiple tenants. To protect the data in the case of a security breach, the data may be encrypted at rest in the database. However, encrypting the data may reduce certain query functionality associated with the database, because a query function may use un-encrypted data (i.e., plaintext) as inputs. Therefore, to run a query on encrypted data (i.e., ciphertext), a user may have to first decrypt all the data. However, decrypting large amounts of ciphertext may introduce latency and computational complexity.

In accordance with aspects of the disclosure, a database system may be configured to index the encrypted data and then query the encrypted data based on the indexes. For example, as part of the encryption process, the system may use an indexing function (e.g., a secure hash function) to generate indexes associated with each plaintext value. In some cases, an index may also be generated based on an encryption key, a data field-specific salt, or a combination of the two. The indexes may be stored and associated with the plaintext values within the database.

The parameters of the indexing function may be adjusted to balance the computational efficiencies gained from indexing (e.g., selectivity) against the potential security risks associated with indexing. For example, a more selective indexing function may provide a greater correlation between the plaintext values and the index values, which may require decrypting fewer ciphertexts that are unrelated to the query. However, the more information the index value indicates about the corresponding plaintext value, the less secure the encrypted data may be. For example, an unauthorized user may use statistical analysis to determine correlations between the indexes and the plaintexts.

In accordance with aspects of the disclosure, a database system may use an indexing function that introduces at least some collisions. For example, the indexing function may be configured such that two different plaintext values correspond to the same index value. Additionally or alternatively, the indexing function may be configured to further enhance security by injecting randomness, salting the index, anonymizing the index, or some combination of these techniques.

Aspects of the disclosure are initially described in the context of a system supporting an on-demand database service. Processes, such as an encryption process, an indexing process, and a querying process, are then described with reference to filtering encrypted data using indexes. A system for data storage is then described. Aspects of the disclosure are further illustrated by and described with reference to apparatus diagrams, system diagrams, and flowcharts that relate to filtering encrypted data using indexes.

Figure 1:
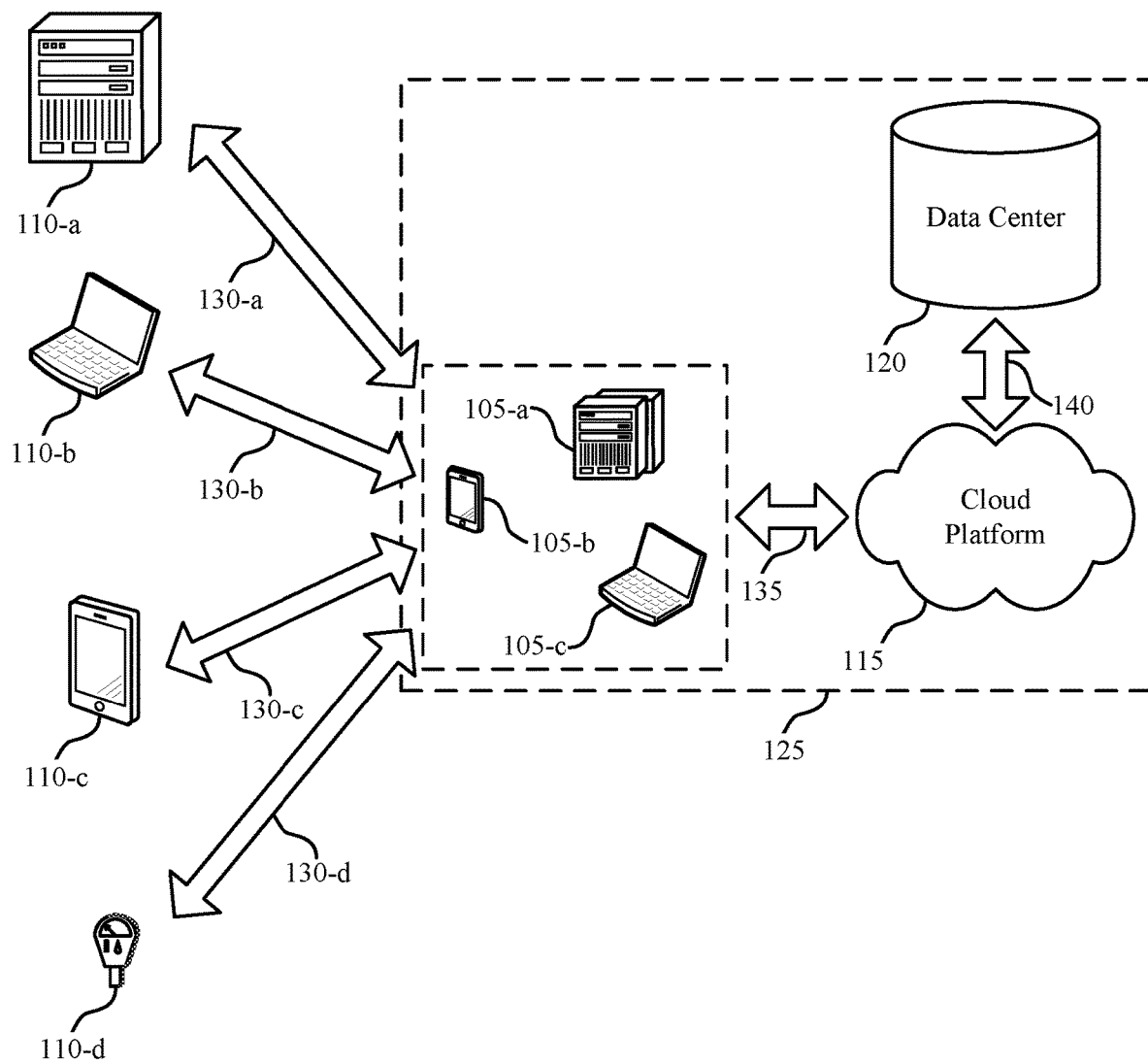
FIG. 1 illustrates an example of a system for storing encrypted data that supports filtering encrypted data using indexes in accordance with various aspects of the present disclosure.

FIG. 1 illustrates an example of a system 100 for cloud computing that supports filtering encrypted data using indexes in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type. In some cases, data center 120 may receive a query from a cloud client 105 and may perform filtering on encrypted data using indexes.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, data center 120 may store encrypted data in a database. For example, a cloud client 105 may select one or more data fields of a data object (e.g., a name field, a social security number field, a credit card number field, etc.) for encryption. The cloud client 105 may receive data from a contact 110, and may send the data through cloud platform 115 to data center 120 for storage. In some cases, either cloud platform 115 or data center 120 may include an encryption service, which may identify any fields of the data designated for encryption. The encryption service may transform the plaintext of the data fields into ciphertext to be stored in data center 120. During the encryption process, the cloud platform 115 or data center 120 may also generate an index associated with the ciphertext using a indexing function. The index may include an index value for filtering, which may be generated based on the plaintext, an encryption key, a field-specific salt, or any combination thereof.

A cloud client 105 may transmit a query to retrieve data from data center 120. In some cases, the query may include filtering on an encrypted data field. For example, if the cloud client 105 wants to retrieve data associated with a specific contact 110, the query may include a where clause specifying the name of the contact 110. However, if the name field is encrypted, data center 120 may not be able to determine if the ciphertext stored in the name field corresponds to the specified name. Data center 120 may decrypt the ciphertext (e.g., in the database) in order to evaluate the where clause. Decrypting the name field for each data object may involve high computational complexity and may introduce querying latency.

To reduce the computational complexity and latency of the decryption process, the data center 120 may perform filtering on the data objects based on the indexes. For example, data center 120 may compute a set of index values associated with the name specified in the where clause of the query. Data center 120 may then check each index associated with ciphertext stored for the name field. If an index has an index value that is included in the set of computed index values, data center 120 may determine to decrypt the associated ciphertext. However, data center 120 may refrain from decrypting any ciphertext with an index that has an index value not included in the set of computed index values. In this way, data center 120 may reduce the quantity of ciphertexts to decrypt in order to process a query.

Figure 2:
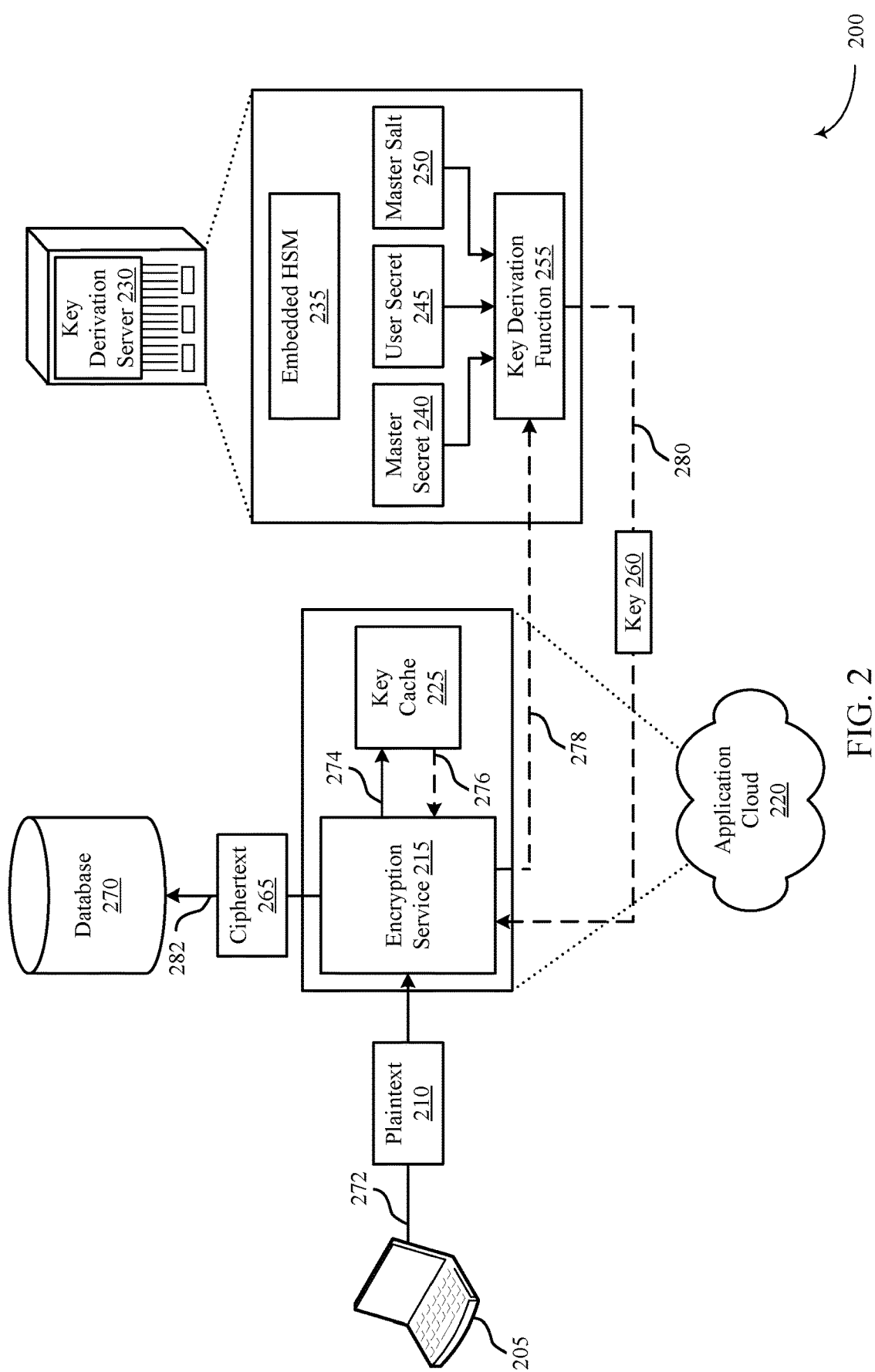
FIG. 2 illustrates an example of an encryption process that supports filtering encrypted data using indexes in accordance with various aspects of the present disclosure.

FIG. 2 illustrates an example of an encryption process 200 that supports filtering encrypted data using indexes in accordance with various aspects of the present disclosure. Encryption process 200 may be initiated by a user device 205, which may be an example of a cloud client 105 or a contact 110 as described with reference to FIG. 1. The user device 205 may send a data object to a database 270 to be stored. In some cases, the data object may include one or more plaintext data fields that are designated for encryption. The plaintext 210 may be encrypted in an application cloud 220 or in the database 270 based on an encryption key 260 generated by a key derivation server 230. In some case, the database 270 and the key derivation server 230 may be components of a data center 120 as described with reference to FIG. 1. Encryption process 200 may convert the plaintext 210 into ciphertext 265, and may store the ciphertext 265 at the database 270. At a later time, a user may query for the data object stored in the database 270, and the database 270 may filter its stored data objects using indexes to reduce decryption latency or computational cost.

A database 270 may implement encryption to block users without a certain authorization level from viewing data. Encryption may provide security for data at rest (i.e., data stored at the database 270), and may or may not provide security for data being transmitted or received. In some cases, the database 270 may additionally implement security for data being transmitted or received, such as transport layer security. In some cases, a user 205 may turn encryption on or off, and may specify the data for encryption. Similarly, a user may turn indexing on or off, based on security levels or desired functionality for the data. Some examples of data a user may select to encrypt include personally identifiable information (PII), sensitive, confidential, or proprietary data, or any other data that the user wants to stop unauthorized users from accessing in the database 270. In some cases, the encrypted data may be a data field within a data object, a data file, or an attachment.

In some cases, encryption process 200 may incur a tradeoff between data security and functionality. For example, a user may run functions on data objects in the application cloud 220. However, some of these functions may not be designed to run on encrypted data. Encryption process 200 may be an example of probabilistic encryption (i.e., non-deterministic encryption, such as strong symmetric non-deterministic encryption), or may be an example of deterministic encryption. In some cases, probabilistic encryption may support less functionality than deterministic encryption, but may provide better data security. In one example, encryption process 200 may be an example of a probabilistic encryption process utilizing the AES with 256-bit keys. Encryption process 200 may additionally use cipher block chaining (CBC), public key cryptography standards (PKCS) for padding (e.g., PKCS #5), a random initialization vector (IV), or any combination thereof.

At 272, a user device 205 may send a data object to database 270 for storage. The data object may first be sent to the application cloud 220, which may include encryption service 215 and key cache 225. The data object may include a set of data fields (e.g., an organization identifier field, a name field, a phone number field, a price field, etc.). In some cases, one or more of the data fields may be designated for encryption. For example, a user may select to encrypt the name field. When the data object is received at the encryption service 215, a runtime engine may determine whether the data object contains any data designated for encryption. The encryption service 215 may identify the name field, and may initiate encryption of the plaintext 210 corresponding to the name field of the data object.

At 274, the encryption service 215 may request an encryption key 260 from the key cache 225. An encryption key 260 that was recently used may be stored in the key cache 225, which may be an example of an application server cache. For example, when the encryption service 215 encrypts data using an encryption key 260, the encryption service 215 may store the encryption key 260 in the key cache 225. However, the encryption key 260 may not persist in the key cache 225. For example, the key cache 225 may flush its storage or remove the encryption key 260 based on a cache replacement algorithm (e.g., a least recently used (LRU) cache algorithm). The key cache 225 may identify whether it contains the encryption key 260 corresponding to the data field to be encrypted (e.g., based on metadata associated with the data object or the data field). If the key cache 225 identifies the encryption key 260, the key cache 225 may send the encryption key 260 to the encryption service 215 at 276. Otherwise, the key cache 225 may send an indication to the encryption service 215 that the key cache 225 does not contain the encryption key 260. In some cases, the key cache 225 may not send an indication to the encryption service 215, and the encryption service 215 may determine to derive the encryption key 260 based on not receiving a response from the key cache 225.

At 278, the encryption service 215 may send a derivation request to a key derivation server 230 based on not receiving the encryption key 260 from the key cache 225. The key derivation server 230 may include one or more embedded hardware security modules (HSMs) 235, a master secret 240, a user secret 245, a master salt 250, or any combination thereof. The embedded HSMs 235 may be examples of computing devices used to secure and manage encryption keys 260. The master secret 240 and the master salt 250 may be generated periodically or aperiodically (e.g., at the start of each new software release). The master secret 240 may be generated based on a master HSM, which may be physically located at a different location than the key derivation server 230. The user secret 245 may be input by a user or generated on demand based on the embedded HSMs 235. The master secret 240, the user secret 245, the master salt 250, or any combination of these may be input into a key derivation function 255 (e.g., a password-based key derivation function 2 (PBKDF2)). Based on receiving the derivation request along with the master secret 240, the user secret 245, the master salt 250, or a combination of these, the key derivation function 255 may generate an encryption key 260. At 280, the key derivation server 230 may send the encryption key 260, which itself may be encrypted, to the encryption service 215 or the key cache 225.

The encryption service 276 may receive the encryption key 260 (e.g., either from the key cache 225 or the key derivation server 230) and may use the encryption key 260, along with a random IV, to encrypt the plaintext 210 into ciphertext 265. In some cases, the encryption service 215 may additionally generate an index to be used for filtering the data. The index generation may also involve an encryption key 260, which may be derived at the key derivation server 230. The encryption service 215 may store the encryption key 260 in the key cache 225. At 282, the encryption service 215 may store the data object, including the ciphertext 265 for the encrypted data field, in the database 270, along with metadata associated with the data field. The associated metadata may include an indication that the data field contains ciphertext 265, an identifier of the user secret 245 used to derive the encryption key 260, and the random IV used for encryption. In some cases, the encryption service 215 may additionally store the index in the database 270.

In some cases, data already stored in the database 270 may be selected for encryption. In one example, a user may select to turn encryption on for a data field, where one or more data objects stored in the database 270 contain the data field. In another example, the database 270 may periodically re-encrypt stored data with updated encryption keys 260. In either case, the database 270 may send the data objects (or the plaintext 210 or ciphertext 265 stored in the data field) to the application cloud 220 for encryption. The database 270 may send batches of data objects or data fields for encryption in order to reduce overhead associated with the encryption process at any one time. Additionally, in some cases, encryption may occur in the database 270 rather than in the application cloud 220.

In some cases, a user may send a query (e.g., a structured query language (SQL) query or a salesforce object query language (SOQL) query) to retrieve data from the database 270. In some cases, the query may include filtering on encrypted data. For example, the query may include a where clause indicating criteria for the name field, where the name field may be encrypted for one or more data objects. If the name field for a data object contains ciphertext 265, the database 270 may not be able to determine if the data object matches the where clause criteria without decrypting the ciphertext 265. In some cases, the database 270 may decrypt the data fields within the database 270. For example, the database 270 may decrypt the data fields in a procedural language extension to SQL (PL/SQL). In some cases, decryption in the database 270 may be used for a mass encryption background job refactor.

The application cloud 220 may include a query optimizer. The query optimizer may convert instructions from a user, such as querying data, building a report, or building a list view, into SQL queries. The query optimizer may additionally include a decrypt function to support filtering on or ordering by encrypted fields. In some cases, the query optimizer may perform filtering operations in order of highest selectivity. For example, if the query optimizer has multiple filtering operations to perform, the query optimizer may perform a first filtering operation that selects the smallest proportion of data objects from the total number of data objects compared to the other filtering operations. Decrypting data during query optimization may maintain the same level of security achieved by the encryption process 200, while providing filtering functionality. In some cases, the query optimizer may include limitations in order to reduce the number of decryption processes used to filter the data. For example, a SQL query may include a maximum number of times a decrypt function may be called during execution of the SQL query.

For example, a query optimizer implementing a decrypt function may translate the following SOQL query:
  Select Id
  From Account
  Where Phone='415 000 0000'
  Order by Name
into the following SQL query:
  SELECT account_id
  FROM sales.account
  WHERE organization_id='00D . . . '
  AND PlatformEncryption.decrypt(phone1)='415 000 0000'
  ORDER BY PlatformEncryption.decrypt(name)
Translating processes into SQL queries implementing decrypt functions may be used for SOQL queries, list views, reports, or formula fields. Additionally, a user may call a decrypt function in a SQL query written in PL/SQL.

The application cloud 220 may use an encryption key 260 to perform the decrypt function. In some cases, the key cache 225 or the key derivation server 230 may send the encryption key 260 to the database 270 as a bind parameter for decryption. The database 270 may store the bind parameter in an internal dynamic performance (V$) view during processing of the decrypt function. The encryption key 260 may be passed to the database 270 in the Java layer or via PL/Java. For example, a decryption process in PL/SQL may change the PL/SQL signature to receive encryption keys 260 as parameters from an application server. In some cases, the database 270 may implement security protocols to securely pass the encryption keys 260 from the application server into PL/SQL. In some cases, the database 270 may securely add the encryption keys 260 to cContext, and the query optimizer or PL/SQL function may retrieve the encryption keys 260 from cContext for decryption.

In some cases, the system may use a limited number of encryption keys 260 for encryption with encryption service 215, and thus the same limited number of encryption keys 260 for decryption. For example, if filtering on an encrypted data field, the database 270 may contain thousands or millions of stored values of ciphertext 265 for the encrypted data field. Limiting the number of encryption keys 260 needed to decrypt the many values of ciphertext 265 may reduce the processing time for filtering on the encrypted data field.

Decrypting in the database 270 using a decrypt function may introduce some performance issues. For example, a decrypt function lacking selectivity may decrypt every instance of ciphertext 265 for a data field if the rest of the fields for the data object match the query parameters, which may be computationally expensive. In some cases, to improve the selectivity of the decryption process, the database 270 may implement filtering on encrypted data using indexes. In this way, the database 270 may decrypt a portion of the instances of ciphertext 265 corresponding to the selectivity (i.e., the ratio of ciphertexts 265 to decrypt following the filtering compared to the total ciphertexts 265 to be decrypted before filtering), rather than every instance of ciphertext 265. The decrypt function may be an example of an AES decryption algorithm, which may use a non-trivial computation for decryption. Additionally, because the decrypt function may be processed in PL/SQL, while the query may be a SQL query, the system may switch from SQL to PL/SQL and back to SQL during the decryption of each instance of ciphertext 265. This context switching may introduce further latency issues and computational complexity.

In some cases, the system may perform preliminary processing on the encryption keys 260 when the encryption keys 260 are stored at the application server. The application server may optimize caching during this preliminary processing. In some cases, the database 270 may implement a similar procedure for handling the encryption keys 260 to speed up computation needed for the AES decryption algorithm.

In some cases, the system may implement bulk decryption in order to remove the context switching for each instance of ciphertext 265. For example, the database 270 may first process the query with all non-encrypted SQL filters as an inner query. Following the inner query, the query may be passed to a special PL/SQL function, which may perform the encrypted filters in bulk. In this way, the inline context switching may be removed, and the system may perform SQL processing first, followed by PL/SQL processing. In some cases, implementing such a bulk decryption may include modifications to the query builder.

In some cases, the system may implement checks or limits in order to limit the number of data objects the decrypt function may run on. For example, to avoid the extreme latency introduced by running the decrypt function on thousands or millions of data objects, the system may implement a limit that halts the decryption process following a predetermined number of decryption calls. In some cases, a user may specify the limit to the number of decryption calls.

Figure 3:
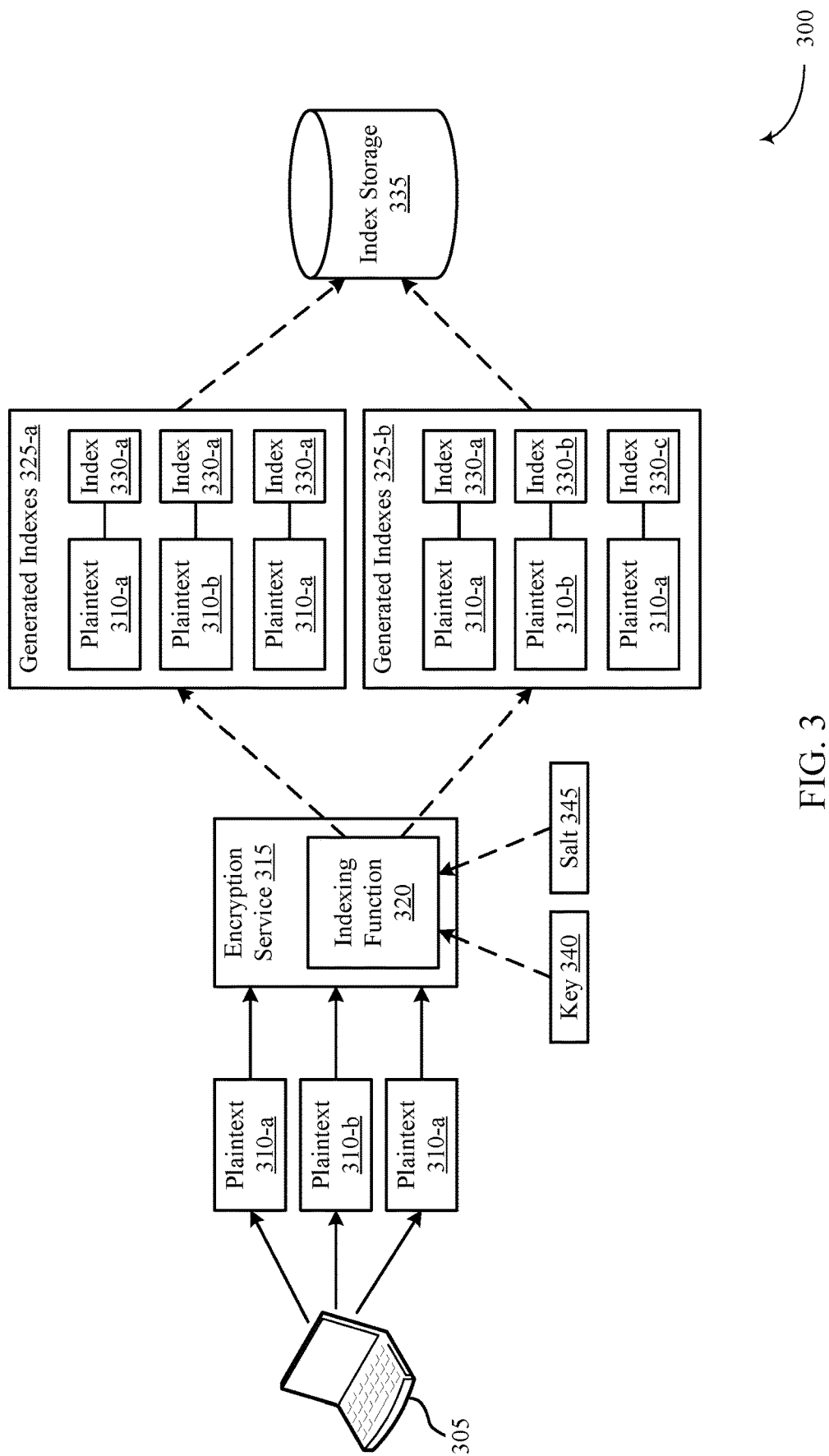
FIG. 3 illustrates an example of an indexing process that supports filtering encrypted data using indexes in accordance with various aspects of the present disclosure.

FIG. 3 illustrates an example of an indexing process 300 that supports filtering encrypted data using indexes in accordance with various aspects of the present disclosure. Indexing process 300 may include multiple options for generating and storing indexes based on plaintext 310. For example, indexing process 300 may illustrate generating indexes with collisions, with injected randomness (e.g., inter-index and intra-index randomness), with field-specific salts 345, or any combination thereof. The plaintexts 310 may be associated with data fields of data objects that are designated for encryption. Indexing process 300 may include user device 305, which may be an example of a cloud client 105 or contact 110 or a user device 205, as described with reference to FIGS. 1 and 2. Additionally, indexing process 300 may include index storage 335, which may be a component of a data center 120 or a database 270, as described with reference to FIGS. 1 and 2.

A system may generate indexes for testing equality of ciphertext (e.g., for filtering or ordering by, such as in "Where" or "Order By" clauses). The system may generate the indexes based on the plaintext 310 corresponding to the ciphertext. In some cases, the system may normalize the plaintext 310 (e.g., through trimming, lowercasing, or both) prior to generating the index in order to handle case insensitivity. In some cases, the system may generate indexes for encrypted data fields with high cardinality (e.g., a name field, a unique identifier field, etc.), and may not generate indexes for encrypted data fields with low cardinality (e.g., a Boolean field, a status flag field, etc.). Additionally, a user may turn indexing on or off for encrypted data. For example, the user may turn indexing on for encrypted data that is often used for filtering (e.g., company names), and may turn indexing off for very sensitive encrypted data (e.g., social security numbers).

In some cases, a user device 305 may send data objects to a database. The data objects may include data fields designated for encryption (e.g., due to user selected policies). In other cases, a user may select to encrypt a data field. A database may contain data objects with the selected data field. In either case, the plaintext 310 associated with the data field designated for encryption may be sent to an encryption service 315. The encryption service 315 may translate the plaintext 310 into ciphertext to be stored in the database, as described with reference to encryption process 200 of FIG. 2.

Additionally, the encryption service 315 may include an indexing function 320 to compute an index value based on the plaintext 310. Each ciphertext stored in a database may have an associated index 330, with an index value based on the plaintext 310, also stored in the database (e.g., in index storage 335).

The indexing function 320 may be adjusted by a user to balance a tradeoff between selectivity and security. For example, when filtering using the indexes, a selectivity value may be measured by a proportion of data objects selected for decryption before and after the filtering process (e.g., a smaller selectivity value may result in greater selectivity for the indexing function 320). In some cases, a system may use the indexing function 320 if the selectivity value is on average smaller than a certain threshold. A smaller selectivity value may result in a smaller decryption overhead. The indexing function 320 may implement some degree of determinism, so that the index is based on the plaintext. This may allow the system to deterministically compute any indexes associated with a plaintext value, which may allow for filtering on the indexes.

The indexing function 320 may be an example of a one way function. For example, a system may compute one or more indexes based on a plaintext value, but computing the plaintext value based on the one or more indexes may be much more computationally complex. Additionally, the system may protect the indexing function 320 with a private key. In this way, an unauthorized user without the private key may not have access to the indexing function 320.

In some cases, the indexing function 320 may implement collisions. Collisions may refer to the indexing function 320 receiving two different plaintext values as input, and generating the same index value for each of the two different plaintext values. In this way, two indexes stored in the database with the same index value may not refer to the same plaintext value. Implementing collisions may reduce the selectivity (e.g., the system may not filter out as many data objects when filtering using the indexes), but may improve the security (e.g., an unauthorized user may not determine whether encrypted data fields contain the same data based on the index value).

In some cases, the system may implement randomness. For example, the system may implement intra-index randomness. With intra-index randomness, the indexing function 320 may generate different index values for the same plaintext value input. For example, the indexing function 320 may have a set of index values corresponding to one plaintext value. The indexing function 320 may generate an index value of the set of index values based on the plaintext value and a key 340. In some cases, the system may implement inter-index randomness. With inter-index randomness, the indexing function 320 may generate different index values for the same plaintext value input across different data fields. For example, each data field may have a field-specific salt 345. The system may randomly determine the field-specific salt 345 for each data field. The indexing function 320 may generate an index value based on the plaintext value and the field-specific salt 345. In this way, the indexing function 320 may be different for each data field, based on the different field-specific salts 345.

In some cases, a system may determine a level of collisions or randomness based on a security threshold set by a user. For example, if a user selects a high degree of security for a data field, the indexing function 320 may implement large amounts of collisions and randomness, which may reduce the selectivity of the indexing function 320.

In some examples, the indexing function 320 may not store the plaintext value or implement a simple hash. Instead, in some cases, the indexing function 320 may implement a secure hash algorithm to generate an index value based on a plaintext value input. In other cases, the indexing function 320 may determine a message authentication code (MAC) based on the plaintext value input, and may use the MAC as the index value.

The indexing function 320 may generate collisions to increase security of the indexes. In some cases, the indexing function 320 may project the results domain of the secure hash algorithm or the possible MACs onto a set of integers smaller than an arbitrary limit "n". For example, if the indexing function 320 uses the MAC, the indexing function 320 may determine a numeric value corresponding to each character of the MAC, sum the determined numeric values, and perform a modulo "n" operation on the sum to determine the index value. In some cases, the value of the arbitrary limit "n" may be based on the number of data objects stored in the database, or on the cardinality of the values in an encrypted data field. In other cases, the value of "n" may be configurable directly by a user, or may be based on a user selected selectivity value. For example, a user may select high selectivity for a certain data field, which may result in a large value of "n" for the indexing function 320 for that data field, and the user may select low selectivity for a second data field (e.g., a data field storing sensitive data), which may result in a small value of "n" for the indexing function 320 for the second data field.

Generated indexes 325-a may be examples of generated indexes 325 implementing collisions. For example, a user device 305 may send three instances of plaintext 310 to the encryption service 315. In some cases, two of the instances of plaintext 310 may have the same plaintext value (e.g., plaintext 310-a) and one of the instances of plaintext 310 may have a different plaintext value (e.g., plaintext 310-b). The encryption service 315 may input the plaintext values into the indexing function 320, which may implement generating collisions. Based on the indexing function 320, the encryption service 315 may output generated indexes 325-a to be stored in index storage 335. For example, the indexing function 320 may generate an index 330-a with a same index value for the same plaintext 310-a. However, due to collisions, the indexing function 320 may also generate an index 330-a with the same index value for the different plaintext 330-b. In this way, an unauthorized user may not determine whether the plaintext 310 associated with a same index value is also the same, as the same index value (e.g., represented by index 330-a) may map to the same or different instance of plaintext 310 (e.g., plaintext 310-a or plaintext 310-b).

Additionally or alternatively, the indexing function 320 may inject randomness to increase security of the indexes. For example, the indexing function 320 may take one key 340 of a set of keys as an input along with the plaintext 310. Each key 340 of the set of keys may result in an index 330 with a different index value. For example, the indexing function 320 may randomly select one key 340 to use from a set of five keys to generate an index 330. In this way, the same plaintext 310 may have five different possible index values. During a filtering process for a value of plaintext 310, the system may determine all possible index values for the value of plaintext 310, and may select all instances of ciphertext corresponding to any of the possible index values for decryption.

Generated indexes 325-b may be examples of generated indexes 325 with injected randomness. For example, the encryption service 315 may receive multiple instances of the same plaintext 310-a. For a first instance of plaintext 310-a, indexing function 320 may use a first key 340 from a set of keys along with the plaintext 310-a to generate an index 330-a with a first index value. However, for the second instance of plaintext 310-a, indexing function 320 may use a second key 340 from the set of keys, and may generate an index 330-c with a second index value. In some cases, encryption service may also receive a different plaintext 310-b, and the indexing function 320 may use the first key 340 and the plaintext 310-b to generate an index 330-b with a third index value. In this way, an unauthorized user may not determine whether the plaintext 310 associated with different index values are different, as different index values (e.g., represented by indexes 330-a, 330-b, and 330-c) may map to the same (e.g., plaintext 310-a for indexes 330-a and 330-c) or different (e.g., plaintext 310-a for index 330-a and plaintext 310-b for index 330-b) instances of plaintext 310.

Additionally or alternatively, the indexing function 320 may salt the index to increase security of the indexes. For example, the indexing function 320 may be different for different data fields. The indexing function 320 may take a field-specific salt 345 as an input, which may alter the indexing function 320. For example, the system may randomly determine a salt 345 for each data field, and may use that salt, along with plaintext 310, when generating indexes 330 using the indexing function 320. In this way, an unauthorized user may not be able to determine correlations between indexes 330 for different data fields.

Generated indexes 325-b may be examples of generated indexes 325 with salted indexes. For example, the encryption service 315 may receive different values of plaintext 310, such as plaintext 310-a and plaintext 310-b, for a first data field. The encryption service 315 may input the different values of plaintext 310, along with a same salt 345 associated with the first data field, into indexing function 320 to generate indexes 330-a and 330-b. The encryption service 315 may then receive a same plaintext 310, such as same plaintext 310-a, for a second data field. The encryption service 315 may input the same plaintext 310-a, along with a different salt 345 associated with the second data field, into indexing function 320 to generate index 330-c with a different index value than index 330-a. In this way, the indexing function 320 may generate different index values for the same plaintext 310-a in different data fields.

In some cases, the system may also encrypt the mapping between an index value and an instance of ciphertext. The database may utilize an internal schema where each index 330 is stored with an indication of the ciphertext the index 330 corresponds to. For example, the indexes 330 may be stored in a table with foreign keys indicating ciphertext stored in another table of data objects. The database may encrypt or obfuscate the indications (e.g., the foreign keys) at rest. In some cases, the database may encrypt an indication of which data object an index 330 corresponds to, which data field an index 330 corresponds to, or a combination thereof. In this way, an unauthorized user may not determine which index 330 stored in the database corresponds to which instance of ciphertext stored in the database.

Figure 4:
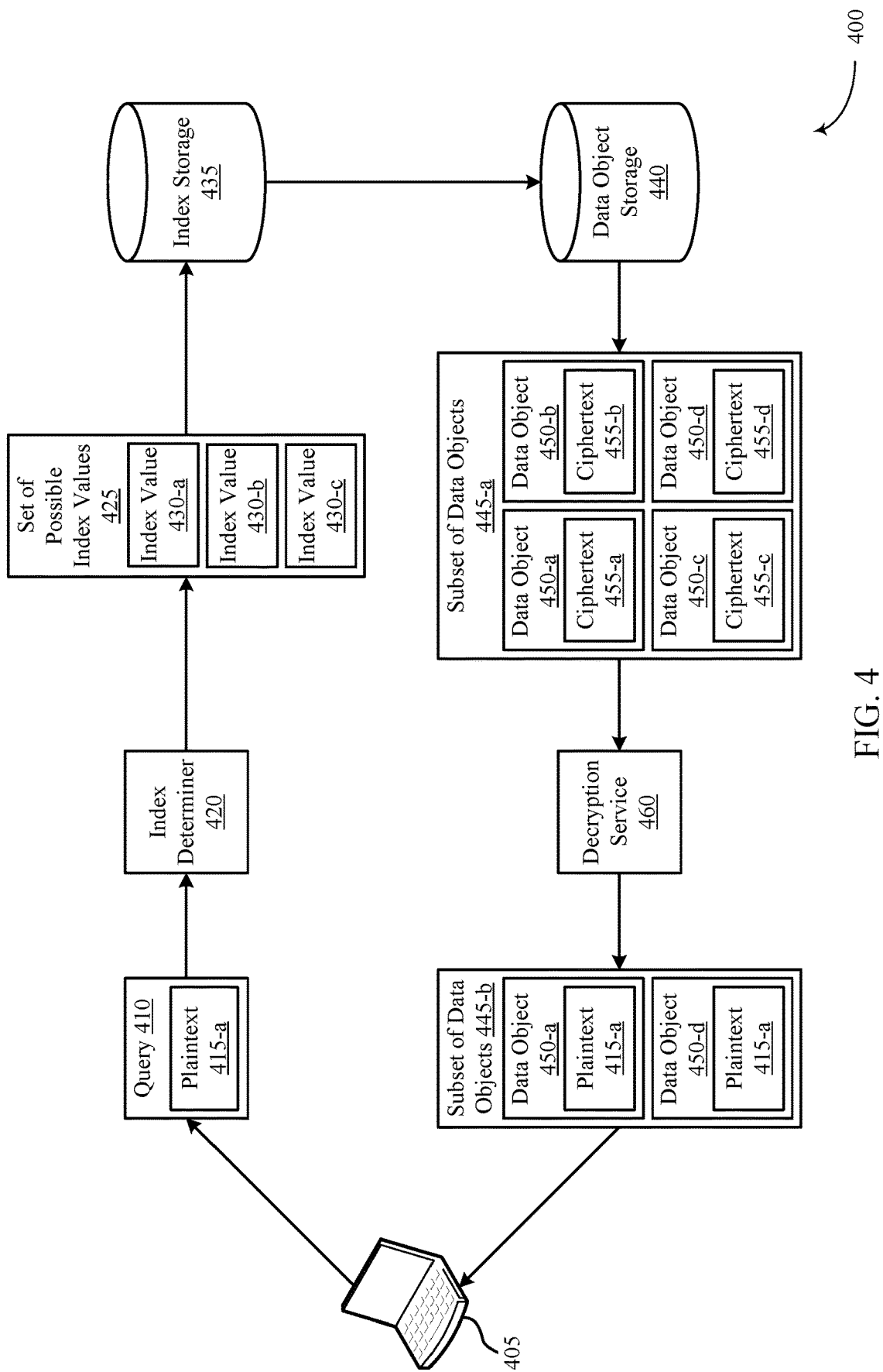
FIG. 4 illustrates an example of a querying process that supports filtering encrypted data using indexes in accordance with various aspects of the present disclosure.

FIG. 4 illustrates an example of a querying process 400 that supports filtering encrypted data using indexes in accordance with various aspects of the present disclosure. Querying process 400 may include querying based on a SQL query, a SOQL query, a list view, a report, or any process that may be translated into a SQL query. Querying process 400 may include a database (e.g., containing both index storage 435 and data object storage 440), such as a data center 120 or database 270, as described with reference to FIGS. 1 and 2. The database may receive a query 410, where the query 410 includes filtering by or ordering on an encrypted data field. To improve performance, the database may select a subset of data objects 445-a based on the indexes for the encrypted data field, and may only decrypt the ciphertext 455 in the encrypted data field for the selected subset of data objects 445-a. In this way, the database may support filtering for encrypted data based on the indexes.

A user device 405 may send a query 410 to a database. In some cases, the query 410 may include filtering on un-encrypted data. The database may perform preliminary filtering on this un-encrypted data, and may determine a set of data objects 450, or a corresponding set of ciphertexts 455, based on the preliminary filtering. The query 410 may further include filtering on a data field, where the database contains data objects that have ciphertext stored for the specified data field. For example, the query 410 may include a where clause, such as where name equals a specific plaintext value 415-a, and encryption is enabled in the database for the name data field. In order to perform the specified filtering based on the where clause, the database may send plaintext value 415-a to an index determiner 420. The index determiner 420 may include an index determining function based on the indexing function 320, as described with reference to FIG. 3. However, the indexing function 320 may generate a single index with an index value from a set of possible index values for a plaintext value 415. The index determining function, in contrast, may determine the set of possible index values 425 for plaintext value 415-*a*. In some cases, the index determining function may be an example of a secure hash algorithm. The index determiner 420 may send the set of possible index values 425 to index storage 435.

Index storage 435 may include a set of indexes, where each index corresponds to an instance of ciphertext 455 stored in data object storage 440. The index storage 435 may identify any stored indexes with index values 430 matching an index value 430 of the set of possible index values 425 (e.g., index values 430-*a*, 430-*b*, or 430-*c*). In some cases, the index storage 435 may only identify the indexes from a set of indexes corresponding to the preliminarily filtered set of data objects 450 or ciphertexts 455. The data object storage 440 may determine the stored instances of ciphertext 455 (e.g., ciphertext 455-*a*, 455-*b*, 455-*c*, and 455-*d*) corresponding to the identified indexes in index storage 435. The data object storage 440 may select a subset of data objects 445-*a* from the total set of data objects stored in data object storage 440, where the subset of data objects 445-*a* includes the data objects 450 which contain the determined instances of ciphertext 455. Data object storage 440 may send the selected subset of data objects 445-*a* to a decryption service 460.

The decryption service 460 may decrypt the instances of ciphertext 455 contained in the data objects 450 of the subset of data objects 445-*a*. In some cases, the decryption may occur within the database. The decryption service 460 may determine the plaintext 415 corresponding to each ciphertext 455 for the filtered data field. The decryption service 460 may identify any instances of plaintext 415 that match the specific plaintext value 415-*a* in the query 410. For example, data objects 450-*a* and 450-*d* may each contain the same plaintext value 415-*a* in the filtered data field, while data objects 450-*b* and 450-*c* may contain different plaintext values 415. Based on this identification, the decryption service 460 may return a subset of data objects 445-*b* that match the specifications of the query 410 (e.g., data objects 450-*a* and 450-*d* containing plaintext value 415-*a*) to the user device 405. In some cases, the decryption service 460 may send data objects 450-*a* and 450-*d* with the decrypted plaintext value 415-*a* to the user device 405. In other cases, the decryption service 460 may send data objects 450-*a* and 450-*d* to the user device 405 with the encrypted ciphertext 455-*a* and 455-*d*, respectively. In yet other cases, the decryption service 460 may send data field information for data objects 450-*a* and 450-*d* to user device 405 based on the query 410. The decryption service 460 may determine whether to send encrypted data or decrypted data to the user device 405 based on an authorization level of a user operating the user device 405.

Figure 5:
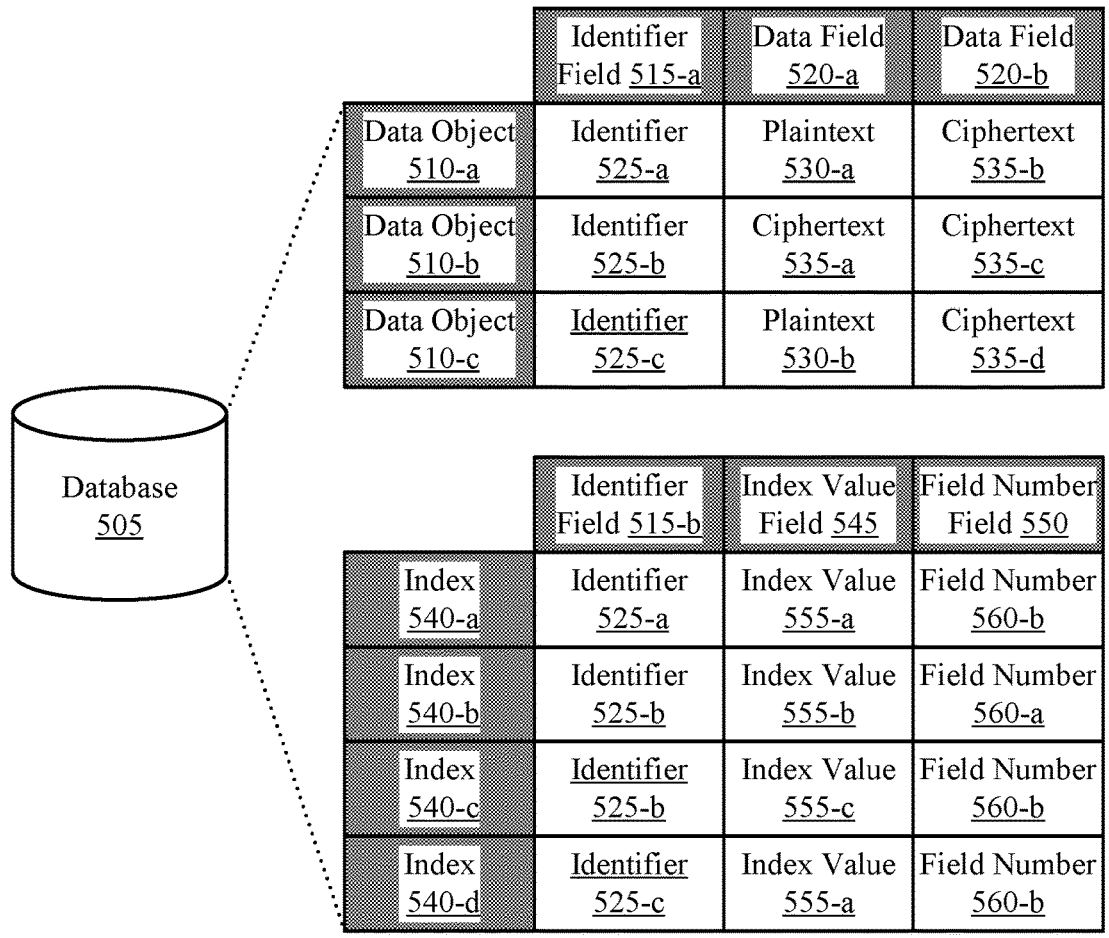
FIG. 5 illustrates an example of data storage that supports filtering encrypted data using indexes in accordance with various aspects of the present disclosure.

FIG. 5 illustrates an example of data storage 500 that supports filtering encrypted data using indexes in accordance with various aspects of the present disclosure. A database 505 may be an example of a data center 120 or a database 270, as described with reference to FIGS. 1 and 2. The database 505 may perform data storage 500. The database 505 may store data objects 510 (e.g., in data object storage 440, as described with reference to FIG. 4) and indexes 540 (e.g., in index storage 435, as described with reference to FIG. 4). In some cases, the database 505 may store the data objects 510 and the indexes 540 in separate tables. Certain data fields 520 within a data object 510 may be encrypted and stored as ciphertext 535 rather than as plaintext 530. In some cases, database 505 may store encrypted fields for the indexes 540 as well. The indexes 540 may provide filtering capabilities for encrypted data fields 520 of the data objects 510.

The database 505 may store data objects 510 with one or more associated identifier fields 515, such as identifier field 515-*a*, and one or more data fields 520, such as data fields 520-*a* and 520-*b*. Identifier field 515-*a* may contain identifiers 525, which may be examples of organization identifiers, record identifiers, data object type identifiers, or any other identifier corresponding to the data object 510. In some cases, the identifiers 525 may be encrypted and stored as ciphertext 535. Data fields 520 may be examples of standard data fields (i.e., data fields that every data object 510 contains) or custom data fields (i.e., data fields specific to a certain type of data object 510). In some cases, encryption may be designated for a certain data field 520. In these cases, rather than storing plaintext 530 for the designated data field 520 for a data object 510, the plaintext 530 may be encrypted and stored as ciphertext 535. In some cases, encryption may be designated for data fields 520 based on an identifier 515. In one example, identifiers 525 may be organization identifiers. An organization (e.g., an organization indicated by identifier 525-*b*) may select to encrypt data field 520-*a*. The database may store data as ciphertext 535-*a* in data field 520-*a* for data object 510-*b*, based on data object 510-*b* containing organization identifier 525-*b*. However, data in data field 520-*a* may remain stored as plaintext 530-*a* and 530-*b* for data objects 510-*a* and 510-*c* based on their different organization identifiers 525-*a* and 525-*c*.

The database 505 may store indexes 540 with one or more associated identifier fields 515, such as identifier field 515-*b*, one or more index value fields 545, and one or more field number fields 550. Identifier field 515-*b* may contain identifiers 525, which may indicate a data object 510 stored in the database 505. Index value field 545 may store index values 555, which may be examples of text values, date values, number values, etc. Field number field 550 may indicate a data field 520 associated with a data object 510. Together, an identifier 525 and a field number 560 may indicate an instance of ciphertext 535 that the index 540 corresponds to. For example, identifier 525-*a* for index 540-*a* may indicate identifier 525-*a* for data object 510-*a*, and field number 560-*b* may indicate data field 520-*b*. Therefore, index 540-*a* may correspond to ciphertext 535-*b*, which is in data field 520-*b* for data object 510-*a*.

The database 505 may generate an index values 555 during an encryption process. An index value 555 may be determined based on an instance of plaintext 530 that is to be encrypted. For example, during the encryption process resulting in ciphertext 535-*b*, the database 505 may encrypt an instance of plaintext 530 into ciphertext 535-*b*. The database 505 may also generate index value 555-*a* corresponding to the plaintext 530 (e.g., during an indexing process 300, as described with reference to FIG. 3), and may store the index value 555-*a*, along with an identifier 525-*a* and field number 560-*b* indicating ciphertext 535-*b*, as index 540-*a*.

The database 505 may use the index values 555 for filtering on instances of ciphertext 535. In some cases, the database 505 may receive a query including filtering on data field 520-*b*. For example, the query may specify a value of plaintext 530 for data field 520-*b*, where the database 505 may return data objects 510 with the specified value of plaintext 530 for data field 520-*b* in response to the query. The database 505 may determine that the data stored for data field 520-*b* is stored as ciphertext 535 (e.g., ciphertext 535-*b*, 535-*c*, and 535-*d*). Based on this determination, the database 505 may identify the indexes 540 corresponding to the ciphertext 535 stored for data field 520-*b* (e.g., indexes 540-*a*, 540-*c*, and 540-*d*, respectively). The database 505 may also determine a set of index values corresponding to the specified value of plaintext 530 in the query. For example, the set of index values may include index value 555-*a*, and may not include index values 555-*b* or 555-*c*. The database 505 may then identify each index 540 corresponding to data field 520-*b* with an index value 555 included in the set of index values (e.g., indexes 540-*a* and 540-*d*, which each have index value 555-*a*).

The database 505 may perform a decryption process on ciphertext 535-*b*, indicated by index 540-*a*, and on ciphertext 535-*d*, indicated by index 540-*d*, and may not perform a decryption process on ciphertext 535-*c* based on the index value 555-*c* not being included in the set of index values. Based on the decryption process, the database 505 may determine whether ciphertext 535-*b* or 535-*d* corresponds to the value of plaintext 530 specified in the query. By implementing filtering on the indexes 540, the database 505 may improve the selectivity of the decryption process. For example, rather than decrypt data field 520-*b* for all three data objects 510, the database 505 may decrypt data field 520-*b* for data objects 510-*a* and 510-*c*, and may not decrypt data field 520-*b* for data object 510-*b*, based on the corresponding indexes 540. In this way, the database 505 may obtain a selectivity value of ⅔ for the decryption process.

Figure 6:
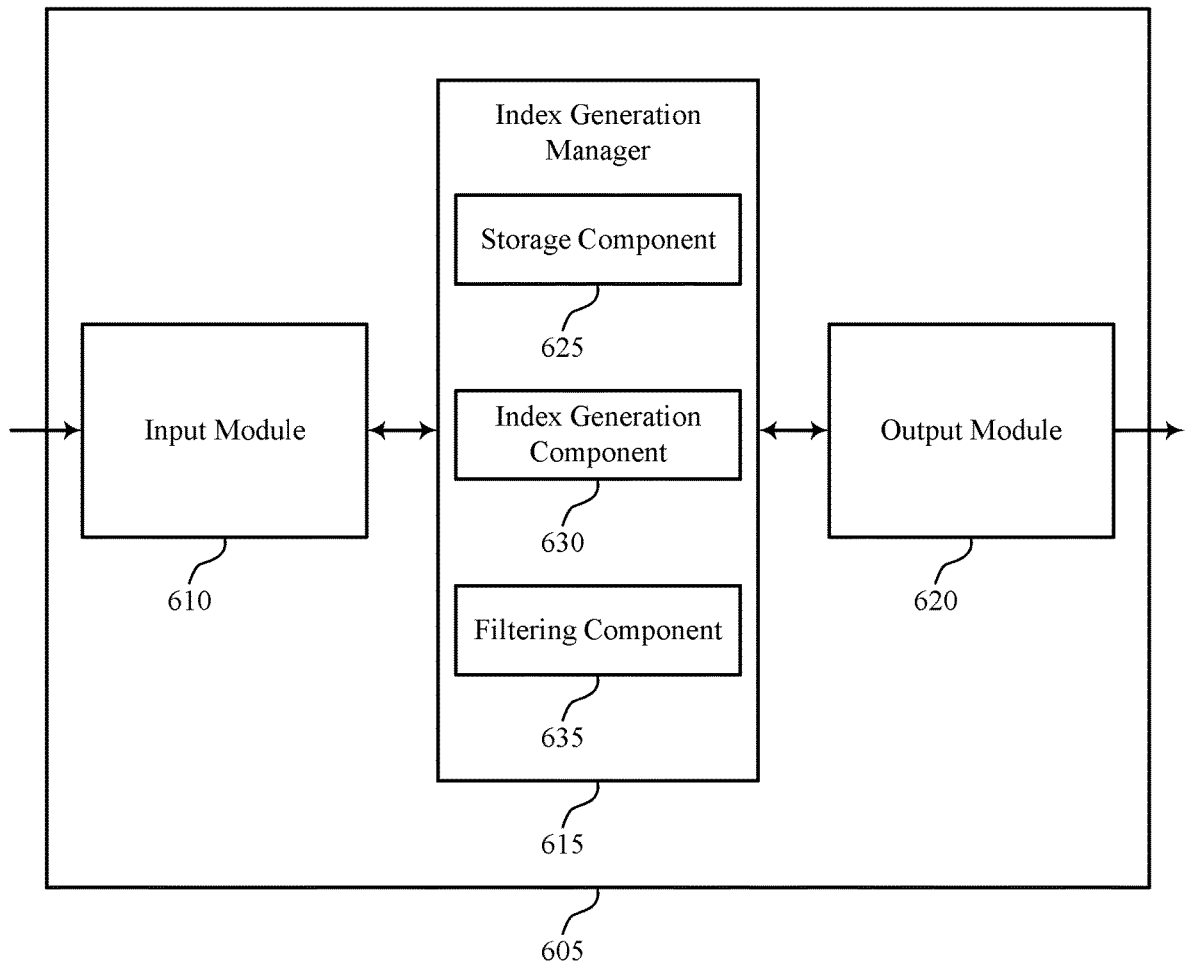
FIGS. 6 through 7 show block diagrams of an apparatus that supports filtering encrypted data using indexes in accordance with aspects of the present disclosure.

FIG. 6 shows a block diagram 600 of an apparatus 605 that supports filtering encrypted data using indexes in accordance with aspects of the present disclosure. Apparatus 605 may include input module 610, index generation manager 615, and output module 620. Apparatus 605 may also include a processor. Each of these components may be in communication with one another (e.g., via one or more buses). In some cases, apparatus 605 may be an example of a user terminal, a database server, or a system containing multiple computing devices. Index generation manager 615 may be an example of aspects of the index generation manager 715 or 815 as described with reference to FIGS. 7 and 8. Index generation manager 615 may also include storage component 625, index generation component 630, and filtering component 635.

Index generation manager 615 and/or at least some of its various sub-components may be implemented in hardware, software executed by a processor, firmware, or any combination thereof. If implemented in software executed by a processor, the functions of the index generation manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The index generation manager 615 and/or at least some of its various sub-components may be physically located at various positions, including being distributed such that portions of functions are implemented at different physical locations by one or more physical devices. In some examples, index generation manager 615 and/or at least some of its various sub-components may be a separate and distinct component in accordance with various aspects of the present disclosure. In other examples, index generation manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Storage component 625 may store a first ciphertext associated with a first plaintext in a data field of a database and store a second ciphertext associated with a second plaintext in the data field, where the first plaintext and the second plaintext are different. In some cases, storage component 625 may store a third ciphertext associated with a third plaintext in the data field, where the first plaintext and the third plaintext are the same, or store a fourth ciphertext associated with a fourth plaintext in a second data field of the database.

Index generation component 630 may generate a first index for the first plaintext and a second index for the second plaintext using an indexing function, where an index value of the first index and an index value of the second index are the same. In some cases, index generation component 630 may also generate a third index for the third plaintext using the indexing function, where an index value of the third index is different than the index value of the first index, or may generate a fourth index for the fourth plaintext using a different indexing function than the indexing function used to generate the first index and second index. In some cases, the indexing function is based on a set of encryption keys, where the first index is generated based on a first encryption key of the set of encryption keys and the third index is generated based on a second encryption key of the set of encryption keys. In some cases, the data field has an associated first salt value and the second data field has an associated second salt value, where the indexing function used to generate the first index and second index is based on the first salt value and the different indexing function used to generate the fourth index is based on the second salt value. In some cases, the indexing function is a secure hash function. In some cases, generating the first index for the first plaintext is based on a first MAC associated with the first plaintext, and generating the second index for the second plaintext is based on a second MAC associated with the second plaintext. In some cases, the index value is a numeric value.

Filtering component 635 may determine a set of index values associated with the first plaintext using the indexing function, where the set of index values includes the index value of the first index and the second index. Filtering component 635 may additionally identify, for a set of ciphertexts stored in the data field, all indexes with index values included in the determined set of index values.

Figure 7:
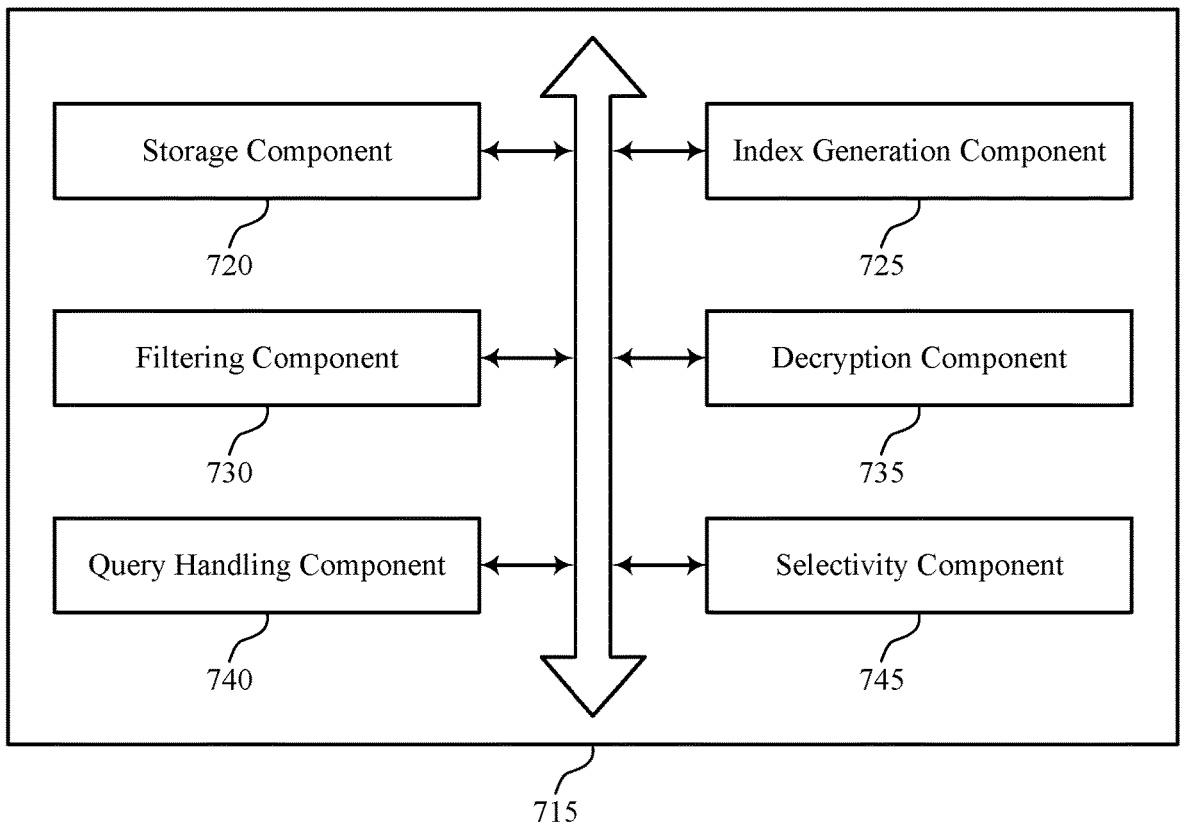

FIG. 7 shows a block diagram 700 of an index generation manager 715 that supports filtering encrypted data using indexes in accordance with aspects of the present disclosure. The index generation manager 715 may be an example of aspects of an index generation manager 615 or 815 as described with reference to FIGS. 6 and 8. The index generation manager 715 may include storage component 720, index generation component 725, filtering component 730, decryption component 735, query handling component 740, and selectivity component 745. Each of these modules may communicate, directly or indirectly, with one another (e.g., via one or more buses).

Storage component 720 may store a first ciphertext associated with a first plaintext in a data field of a database and store a second ciphertext associated with a second plaintext in the data field, where the first plaintext and the second plaintext are different. In some cases, storage component 720 may store a third ciphertext associated with a third plaintext in the data field, where the first plaintext and the third plaintext are the same, or store a fourth ciphertext associated with a fourth plaintext in a second data field of the database.

Index generation component 725 may generate a first index for the first plaintext and a second index for the second plaintext using an indexing function, where an index value of the first index and an index value of the second index are the same. In some cases, index generation component 725 may generate a third index for the third plaintext using the indexing function, where an index value of the third index is different than the index value of the first index, or generate a fourth index for the fourth plaintext using a different indexing function than the indexing function used to generate the first index and second index. Additionally, in some cases, the indexing function is based on a set of encryption keys, where the first index is generated based on a first encryption key of the set of encryption keys and the third index is generated based on a second encryption key of the set of encryption keys. In some cases, the data field has an associated first salt value and the second data field has an associated second salt value, where the indexing function used to generate the first index and second index is based on the first salt value and the different indexing function used to generate the fourth index is based on the second salt value. In some cases, the indexing function is a secure hash function. In some cases, generating the first index for the first plaintext is based on a first MAC associated with the first plaintext, and generating the second index for the second plaintext is based on a second MAC associated with the second plaintext. In some cases, the index value is a numeric value.

Filtering component 730 may determine a set of index values associated with the first plaintext using the indexing function, where the set of index values includes the index value of the first index and the second index. Filtering component 730 may additionally identify, for a set of ciphertexts stored in the data field, all indexes with index values included in the determined set of index values.

Decryption component 735 may decrypt the first ciphertext and the second ciphertext based on identifying that the index value of the first index and the second index is included in the determined set of index values. In some cases, the first ciphertext and the second ciphertext are decrypted within the database.

Query handling component 740 may receive a query request message including a request to filter on the first plaintext for the data field, where determining the set of index values is based on the query request message.

Selectivity component 745 may adjust a selectivity of the indexing function, where the selectivity includes a ratio between a quantity of the identified indexes and a total quantity of the set of ciphertexts stored in the data field.

Figure 8:
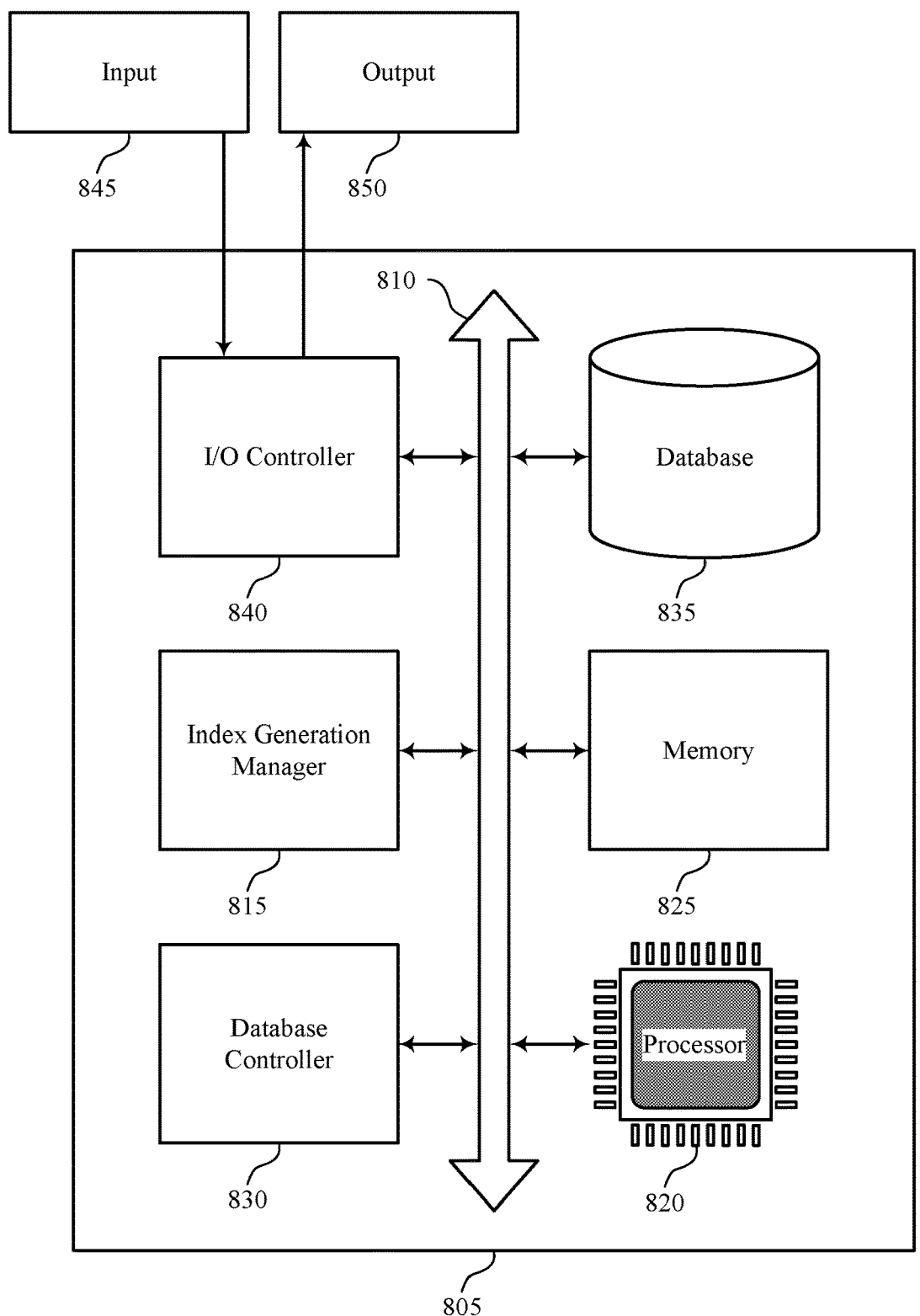
FIG. 8 illustrates a block diagram of a system including a database system that supports filtering encrypted data using indexes in accordance with aspects of the present disclosure.

FIG. 8 shows a diagram of a system 800 including a subsystem 805 that supports filtering encrypted data using indexes in accordance with aspects of the present disclosure. Subsystem 805 may be an example of or include the components of database system, such as a data center 120 as described above, e.g., with reference to FIG. 1. Subsystem 805 may include components for bi-directional data communications. For example, subsystem 805 may include components for transmitting and receiving communications, including index generation manager 815, processor 820, memory 825, database controller 830, database 835, and I/O controller 840. These components may be in electronic communication via one or more busses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting filtering encrypted data using indexes).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Database controller 830 may manage data storage and processing in database 835. In some cases, a user may interact with database controller 830. In other cases, database controller 830 may operate automatically without user interaction. Database 835 may be an example of a single database, a distributed database, multiple distributed databases, or an emergency backup database.

I/O controller 840 may manage input and output signals for subsystem 805. I/O controller 840 may also manage peripherals not integrated into subsystem 805. In some cases, I/O controller 840 may represent a physical connection or port to an external peripheral. In some cases, I/O controller 840 may utilize an operating system such as iOS®, ANDROID®, MS-DOS®, MS-WINDOWS®, OS/2®, UNIX®, LINUX®, or another known operating system. In other cases, I/O controller 840 may represent or interact with a modem, a keyboard, a mouse, a touchscreen, or a similar device. In some cases, I/O controller 840 may be implemented as part of a processor. In some cases, a user may interact with subsystem 805 via I/O controller 840 or via hardware components controlled by I/O controller 840.

Figure 9:
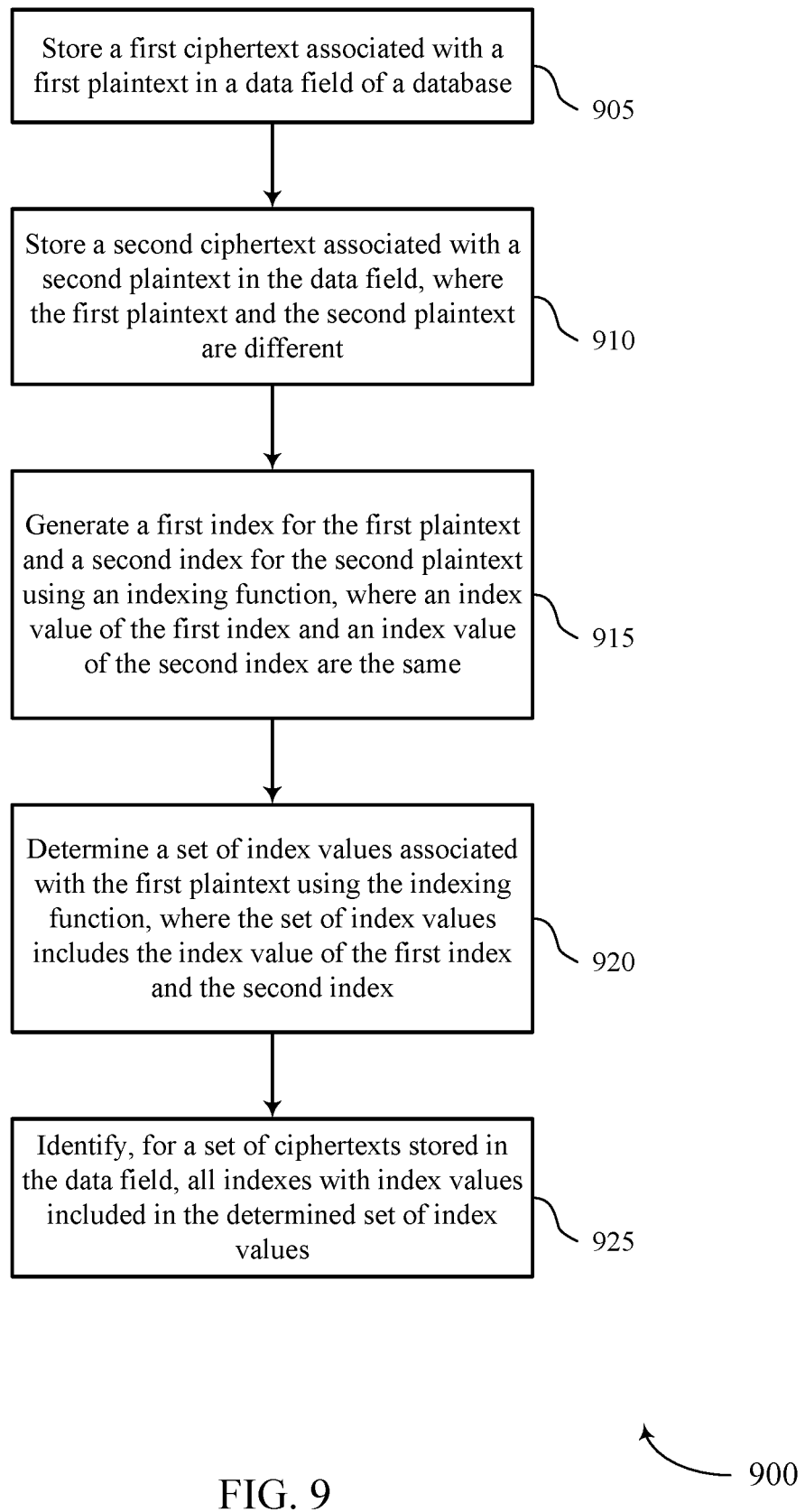
FIGS. 9 through 12 illustrate methods for filtering encrypted data using indexes in accordance with aspects of the present disclosure.

FIG. 9 shows a flowchart illustrating a method 900 for filtering encrypted data using indexes in accordance with aspects of the present disclosure. The operations of method 900 may be implemented by a database system, such as a data center 120 as described with reference to FIG. 1, or its components as described herein. For example, the operations of method 900 may be performed by an index generation manager as described with reference to FIGS. 6 through 8. In some examples, a database system may execute a set of codes to control the functional elements of the device to perform the functions described below. Additionally or alternatively, the database system may perform aspects of the functions described below using special-purpose hardware.

At block 905 the database system may store a first ciphertext associated with a first plaintext in a data field of a database. The operations of block 905 may be performed according to the methods described with reference to FIGS. 1 through 5. In certain examples, aspects of the operations of block 905 may be performed by a storage component as described with reference to FIGS. 6 through 8.

At block 910 the database system may store a second ciphertext associated with a second plaintext in the data field, wherein the first plaintext and the second plaintext are different. The operations of block 910 may be performed according to the methods described with reference to FIGS. 1 through 5. In certain examples, aspects of the operations of block 910 may be performed by a storage component as described with reference to FIGS. 6 through 8.

At block 915 the database system may generate a first index for the first plaintext and a second index for the second plaintext using an indexing function, wherein an index value of the first index and an index value of the second index are the same. The operations of block 915 may be performed according to the methods described with reference to FIGS. 1 through 5. In certain examples, aspects of the operations of block 915 may be performed by an index generation component as described with reference to FIGS. 6 through 8.

At block 920 the database system may determine a set of index values associated with the first plaintext using the indexing function, wherein the set of index values comprises the index value of the first index and the second index. The operations of block 920 may be performed according to the methods described with reference to FIGS. 1 through 5. In certain examples, aspects of the operations of block 920 may be performed by a filtering component as described with reference to FIGS. 6 through 8.

At block 925 the database system may identify, for a set of ciphertexts stored in the data field, all indexes with index values included in the determined set of index values. The operations of block 925 may be performed according to the methods described with reference to FIGS. 1 through 5. In certain examples, aspects of the operations of block 925 may be performed by a filtering component as described with reference to FIGS. 6 through 8.

Figure 10:
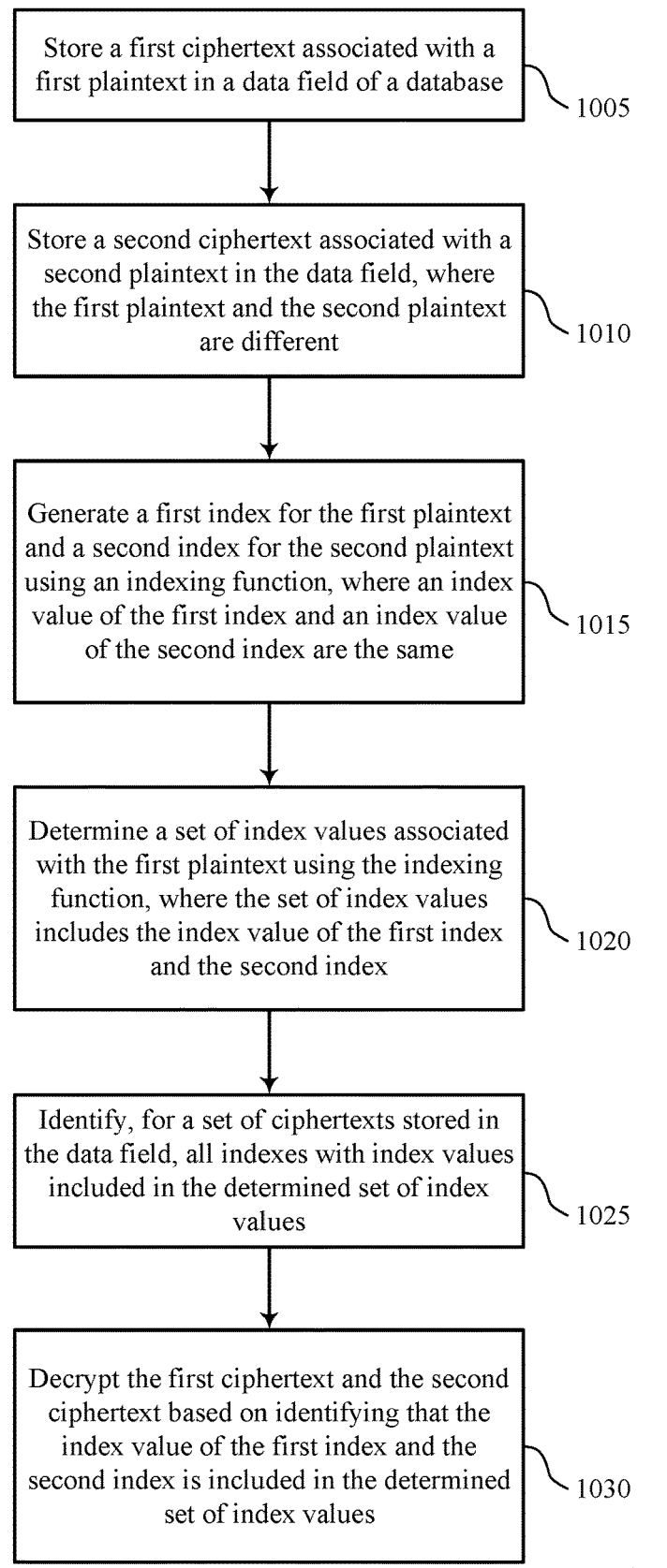

FIG. 10 shows a flowchart illustrating a method 1000 for filtering encrypted data using indexes in accordance with aspects of the present disclosure. The operations of method 1000 may be implemented by a database system, such as a data center 120 as described with reference to FIG. 1, or its components as described herein. For example, the operations of method 1000 may be performed by an index generation manager as described with reference to FIGS. 6 through 8. In some examples, a database system may execute a set of codes to control the functional elements of the device to perform the functions described below. Additionally or alternatively, the database system may perform aspects of the functions described below using special-purpose hardware.

At block 1005 the database system may store a first ciphertext associated with a first plaintext in a data field of a database. The operations of block 1005 may be performed according to the methods described with reference to FIGS. 1 through 5. In certain examples, aspects of the operations of block 1005 may be performed by a storage component as described with reference to FIGS. 6 through 8.

At block 1010 the database system may store a second ciphertext associated with a second plaintext in the data field, wherein the first plaintext and the second plaintext are different. The operations of block 1010 may be performed according to the methods described with reference to FIGS. 1 through 5. In certain examples, aspects of the operations of block 1010 may be performed by a storage component as described with reference to FIGS. 6 through 8.

At block 1015 the database system may generate a first index for the first plaintext and a second index for the second plaintext using an indexing function, wherein an index value of the first index and an index value of the second index are the same. The operations of block 1015 may be performed according to the methods described with reference to FIGS. 1 through 5. In certain examples, aspects of the operations of block 1015 may be performed by an index generation component as described with reference to FIGS. 6 through 8.

At block 1020 the database system may determine a set of index values associated with the first plaintext using the indexing function, wherein the set of index values comprises the index value of the first index and the second index. The operations of block 1020 may be performed according to the methods described with reference to FIGS. 1 through 5. In certain examples, aspects of the operations of block 1020 may be performed by a filtering component as described with reference to FIGS. 6 through 8.

At block 1025 the database system may identify, for a set of ciphertexts stored in the data field, all indexes with index values included in the determined set of index values. The operations of block 1025 may be performed according to the methods described with reference to FIGS. 1 through 5. In certain examples, aspects of the operations of block 1025 may be performed by a filtering component as described with reference to FIGS. 6 through 8.

At block 1030 the database system may decrypt the first ciphertext and the second ciphertext based at least in part on identifying that the index value of the first index and the second index is included in the determined set of index values. The operations of block 1030 may be performed according to the methods described with reference to FIGS. 1 through 5. In certain examples, aspects of the operations of block 1030 may be performed by a decryption component as described with reference to FIGS. 6 through 8.

Figure 11:
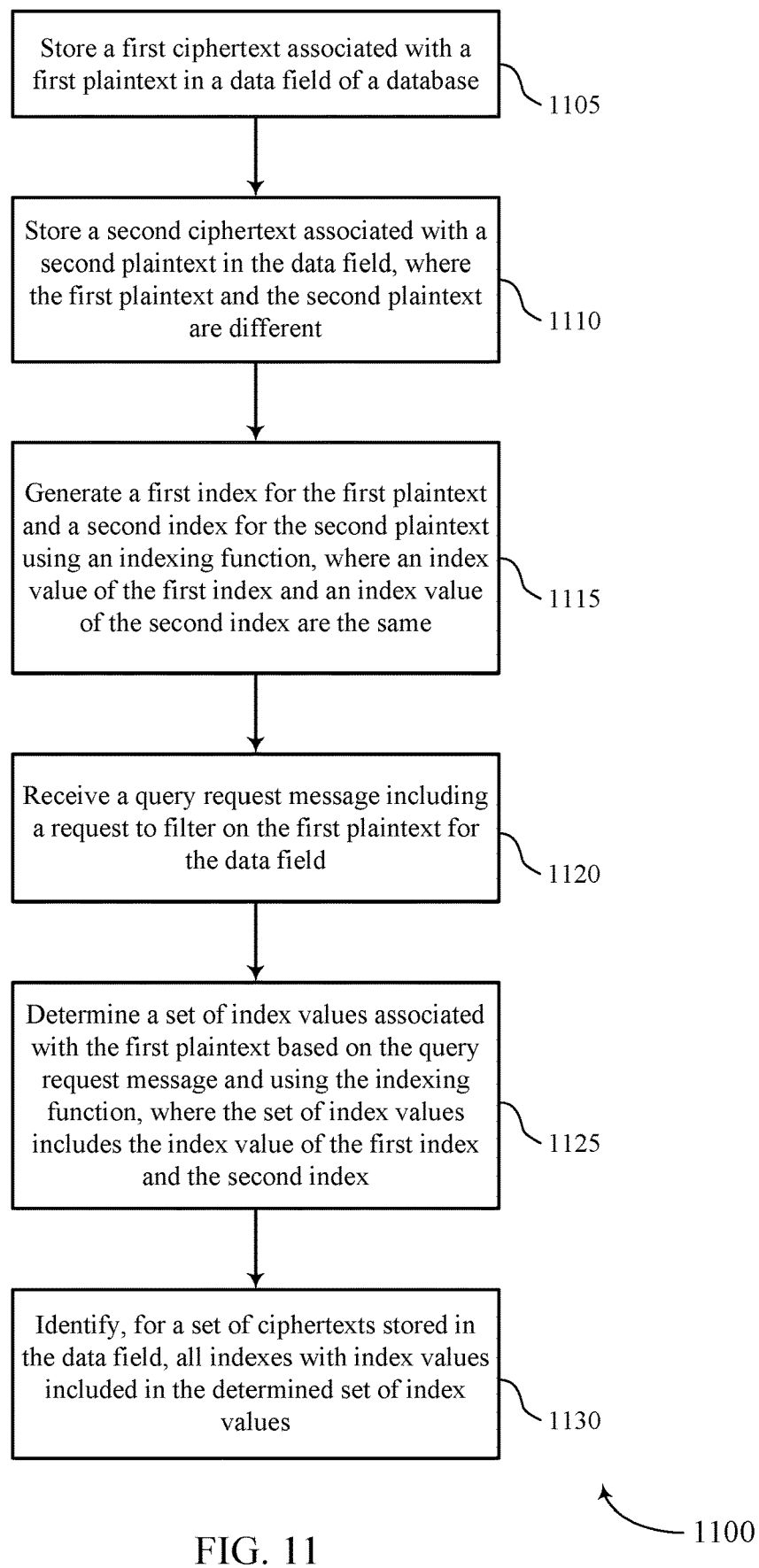

FIG. 11 shows a flowchart illustrating a method 1100 for filtering encrypted data using indexes in accordance with aspects of the present disclosure. The operations of method 1100 may be implemented by a database system, such as a data center 120 as described with reference to FIG. 1, or its components as described herein. For example, the operations of method 1100 may be performed by an index generation manager as described with reference to FIGS. 6 through 8. In some examples, a database system may execute a set of codes to control the functional elements of the device to perform the functions described below. Additionally or alternatively, the database system may perform aspects of the functions described below using special-purpose hardware.

At block 1105 the database system may store a first ciphertext associated with a first plaintext in a data field of a database. The operations of block 1105 may be performed according to the methods described with reference to FIGS. 1 through 5. In certain examples, aspects of the operations of block 1105 may be performed by a storage component as described with reference to FIGS. 6 through 8.

At block 1110 the database system may store a second ciphertext associated with a second plaintext in the data field, wherein the first plaintext and the second plaintext are different. The operations of block 1110 may be performed according to the methods described with reference to FIGS. 1 through 5. In certain examples, aspects of the operations of block 1110 may be performed by a storage component as described with reference to FIGS. 6 through 8.

At block 1115 the database system may generate a first index for the first plaintext and a second index for the second plaintext using an indexing function, wherein an index value of the first index and an index value of the second index are the same. The operations of block 1115 may be performed according to the methods described with reference to FIGS. 1 through 5. In certain examples, aspects of the operations of block 1115 may be performed by an index generation component as described with reference to FIGS. 6 through 8.

At block 1120 the database system may receive a query request message including a request to filter on the first plaintext for the data field. The operations of block 1120 may be performed according to the methods described with reference to FIGS. 1 through 5. In certain examples, aspects of the operations of block 1120 may be performed by a query handling component as described with reference to FIGS. 6 through 8.

At block 1125 the database system may determine a set of index values associated with the first plaintext based at least in part on the query request message and using the indexing function, wherein the set of index values comprises the index value of the first index and the second index. The operations of block 1125 may be performed according to the methods described with reference to FIGS. 1 through 5. In certain examples, aspects of the operations of block 1125 may be performed by a filtering component as described with reference to FIGS. 6 through 8.

At block 1130 the database system may identify, for a set of ciphertexts stored in the data field, all indexes with index values included in the determined set of index values. The operations of block 1130 may be performed according to the methods described with reference to FIGS. 1 through 5. In certain examples, aspects of the operations of block 1130 may be performed by a filtering component as described with reference to FIGS. 6 through 8.

Figure 12:
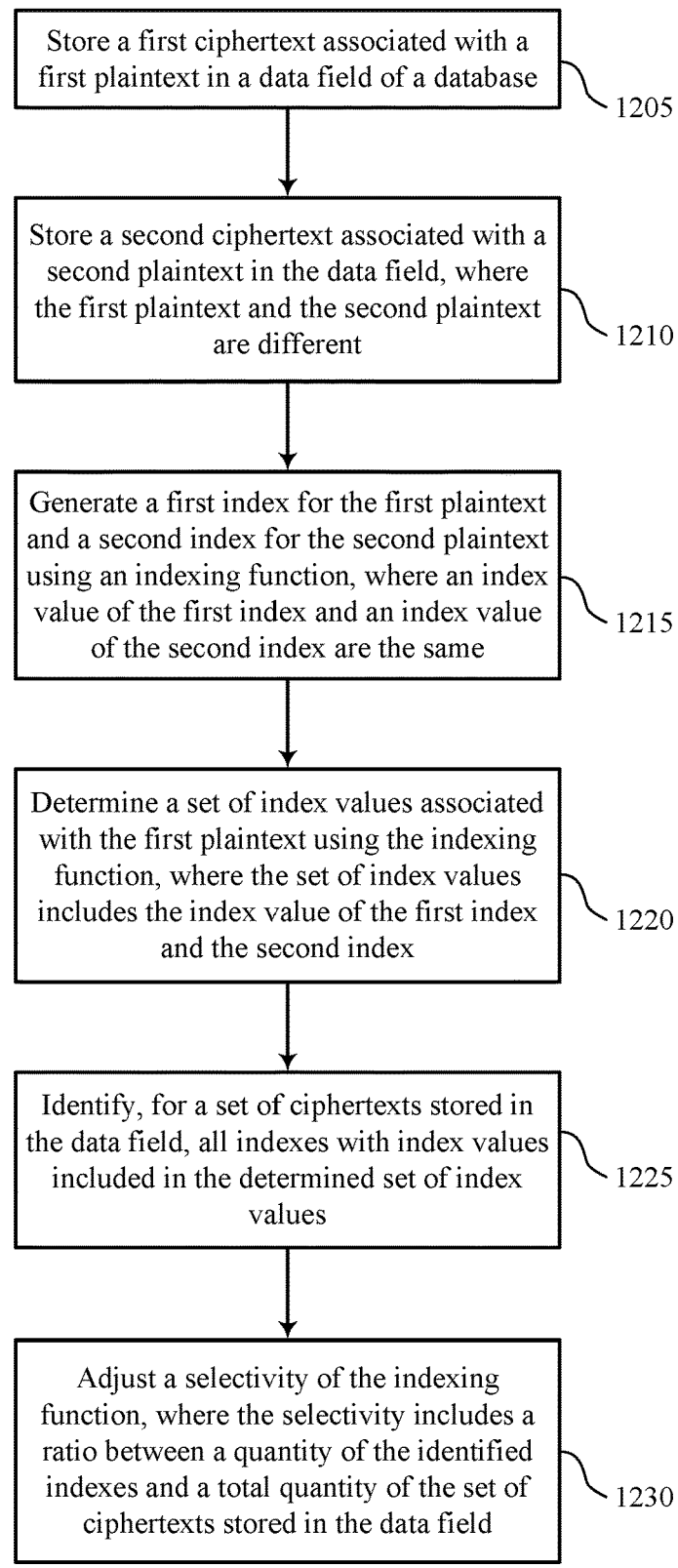

FIG. 12 shows a flowchart illustrating a method 1200 for filtering encrypted data using indexes in accordance with aspects of the present disclosure. The operations of method 1200 may be implemented by a database system, such as a data center 120 as described with reference to FIG. 1, or its components as described herein. For example, the operations of method 1200 may be performed by an index generation manager as described with reference to FIGS. 6 through 8. In some examples, a database system may execute a set of codes to control the functional elements of the device to perform the functions described below. Additionally or alternatively, the database system may perform aspects of the functions described below using special-purpose hardware.

At block 1205 the database system may store a first ciphertext associated with a first plaintext in a data field of a database. The operations of block 1205 may be performed according to the methods described with reference to FIGS. 1 through 5. In certain examples, aspects of the operations of block 1205 may be performed by a storage component as described with reference to FIGS. 6 through 8.

At block 1210 the database system may store a second ciphertext associated with a second plaintext in the data field, wherein the first plaintext and the second plaintext are different. The operations of block 1210 may be performed according to the methods described with reference to FIGS. 1 through 5. In certain examples, aspects of the operations of block 1210 may be performed by a storage component as described with reference to FIGS. 6 through 8.

At block 1215 the database system may generate a first index for the first plaintext and a second index for the second plaintext using an indexing function, wherein an index value of the first index and an index value of the second index are the same. The operations of block 1215 may be performed according to the methods described with reference to FIGS. 1 through 5. In certain examples, aspects of the operations of block 1215 may be performed by an index generation component as described with reference to FIGS. 6 through 8.

At block 1220 the database system may determine a set of index values associated with the first plaintext using the indexing function, wherein the set of index values comprises the index value of the first index and the second index. The operations of block 1220 may be performed according to the methods described with reference to FIGS. 1 through 5. In certain examples, aspects of the operations of block 1220 may be performed by a filtering component as described with reference to FIGS. 6 through 8.

At block 1225 the database system may identify, for a set of ciphertexts stored in the data field, all indexes with index values included in the determined set of index values. The operations of block 1225 may be performed according to the methods described with reference to FIGS. 1 through 5. In certain examples, aspects of the operations of block 1225 may be performed by a filtering component as described with reference to FIGS. 6 through 8.

At block 1230 the database system may adjust a selectivity of the indexing function, wherein the selectivity comprises a ratio between a quantity of the identified indexes and a total quantity of the set of ciphertexts stored in the data field. The operations of block 1230 may be performed according to the methods described with reference to FIGS. 1 through 5. In certain examples, aspects of the operations of block 1230 may be performed by a selectivity component as described with reference to FIGS. 6 through 8.

A method of for storing encrypted data is described. The method may include storing a first ciphertext associated with a first plaintext in a data field of a database, storing a second ciphertext associated with a second plaintext in the data field, wherein the first plaintext and the second plaintext are different, generating a first index for the first plaintext and a second index for the second plaintext using an indexing function, wherein an index value of the first index and an index value of the second index are the same, determining a set of index values associated with the first plaintext using the indexing function, wherein the set of index values comprises the index value of the first index and the second index, and identifying, for a set of ciphertexts stored in the data field, all indexes with index values included in the determined set of index values.

Another apparatus for storing encrypted data is described. The apparatus may include a processor, memory in electronic communication with the processor, and instructions stored in the memory. The instructions may be operable to cause the processor to store a first ciphertext associated with a first plaintext in a data field of a database, store a second ciphertext associated with a second plaintext in the data field, wherein the first plaintext and the second plaintext are different, generate a first index for the first plaintext and a second index for the second plaintext using an indexing function, wherein an index value of the first index and an index value of the second index are the same, determine a set of index values associated with the first plaintext using the indexing function, wherein the set of index values comprises the index value of the first index and the second index, and identify, for a set of ciphertexts stored in the data field, all indexes with index values included in the determined set of index values.

A non-transitory computer readable medium for storing encrypted data is described. The non-transitory computer-readable medium may include instructions operable to cause a processor to store a first ciphertext associated with a first plaintext in a data field of a database, store a second ciphertext associated with a second plaintext in the data field, wherein the first plaintext and the second plaintext are different, generate a first index for the first plaintext and a second index for the second plaintext using an indexing function, wherein an index value of the first index and an index value of the second index are the same, determine a set of index values associated with the first plaintext using the indexing function, wherein the set of index values comprises the index value of the first index and the second index, and identify, for a set of ciphertexts stored in the data field, all indexes with index values included in the determined set of index values.

Some examples of the method, apparatus, and non-transitory computer-readable medium described above may further include processes, features, means, or instructions for decrypting the first ciphertext and the second ciphertext based at least in part on identifying that the index value of the first index and the second index may be included in the determined set of index values.

In some examples of the method, apparatus, and non-transitory computer-readable medium described above, the first ciphertext and the second ciphertext may be decrypted within the database.

Some examples of the method, apparatus, and non-transitory computer-readable medium described above may further include processes, features, means, or instructions for receiving a query request message including a request to filter on the first plaintext for the data field, wherein determining the set of index values may be based at least in part on the query request message.

Some examples of the method, apparatus, and non-transitory computer-readable medium described above may further include processes, features, means, or instructions for adjusting a selectivity of the indexing function, wherein the selectivity comprises a ratio between a quantity of the identified indexes and a total quantity of the set of ciphertexts stored in the data field.

Some examples of the method, apparatus, and non-transitory computer-readable medium described above may further include processes, features, means, or instructions for storing a third ciphertext associated with a third plaintext in the data field, wherein the first plaintext and the third plaintext may be the same. Some examples of the method, apparatus, and non-transitory computer-readable medium described above may further include processes, features, means, or instructions for generating a third index for the third plaintext using the indexing function, wherein an index value of the third index may be different than the index value of the first index.

In some examples of the method, apparatus, and non-transitory computer-readable medium described above, the indexing function may be based at least in part on a set of encryption keys, wherein the first index may be generated based at least in part on a first encryption key of the set of encryption keys and the third index may be generated based at least in part on a second encryption key of the set of encryption keys.

Some examples of the method, apparatus, and non-transitory computer-readable medium described above may further include processes, features, means, or instructions for storing a fourth ciphertext associated with a fourth plaintext in a second data field of the database. Some examples of the method, apparatus, and non-transitory computer-readable medium described above may further include processes, features, means, or instructions for generating a fourth index for the fourth plaintext using a different indexing function than the indexing function used to generate the first index and second index.

In some examples of the method, apparatus, and non-transitory computer-readable medium described above, the data field may have an associated first salt value and the second data field may have an associated second salt value, wherein the indexing function used to generate the first index and second index may be based at least in part on the first salt value and the different indexing function used to generate the fourth index may be based at least in part on the second salt value.

In some examples of the method, apparatus, and non-transitory computer-readable medium described above, the indexing function may be a secure hash function.

In some examples of the method, apparatus, and non-transitory computer-readable medium described above, the generating the first index for the first plaintext may be based at least in part on a first MAC associated with the first plaintext, and wherein generating the second index for the second plaintext may be based at least in part on a second MAC associated with the second plaintext.

In some examples of the method, apparatus, and non-transitory computer-readable medium described above, the index value may be a numeric value.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for storing encrypted data, comprising:
   storing a first ciphertext associated with a first plaintext in a data field of a database;
   storing a second ciphertext associated with a second plaintext in the data field, wherein the first plaintext and the second plaintext are different;
   generating a first index for the first plaintext and a second index for the second plaintext using an indexing function, wherein an index value of the first index and an index value of the second index are the same;
   receiving a query request message including a request to filter on the first plaintext for the data field;
   determining a set of index values associated with the first plaintext using the indexing function, wherein the set of index values comprises the index value of the first index and the second index, wherein determining the set of index values is based at least in part on the query request message and wherein the indexing function implements collisions to generate the same index value for the first index and the index value for the second index using the first plaintext and the second plaintext different from the first plaintext; and
   identifying, for a set of ciphertexts stored in the data field, all indexes with index values included in the determined set of index values.

2. The method of claim 1, further comprising:
   decrypting the first ciphertext and the second ciphertext based at least in part on identifying that the index value of the first index and the second index is included in the determined set of index values.

3. The method of claim 2, wherein the first ciphertext and the second ciphertext are decrypted within the database.

4. The method of claim 1, further comprising:
   adjusting a selectivity of the indexing function, wherein the selectivity comprises a ratio between a quantity of the identified indexes and a total quantity of the set of ciphertexts stored in the data field.

5. The method of claim 1, further comprising:
   storing a third ciphertext associated with a third plaintext in the data field, wherein the first plaintext and the third plaintext are the same; and
   generating a third index for the third plaintext using the indexing function, wherein an index value of the third index is different than the index value of the first index.

6. The method of claim 5, wherein the indexing function is based at least in part on a set of encryption keys, wherein the first index is generated based at least in part on a first encryption key of the set of encryption keys and the third index is generated based at least in part on a second encryption key of the set of encryption keys.

7. The method of claim 1, further comprising:
   storing a fourth ciphertext associated with a fourth plaintext in a second data field of the database; and
   generating a fourth index for the fourth plaintext using a different indexing function than the indexing function used to generate the first index and second index.

8. The method of claim 7, wherein the data field has an associated first salt value and the second data field has an associated second salt value, wherein the indexing function used to generate the first index and second index is based at least in part on the first salt value and the different indexing function used to generate the fourth index is based at least in part on the second salt value.

9. The method of claim 1, wherein the indexing function is a secure hash function.

10. The method of claim 1, wherein generating the first index for the first plaintext is based at least in part on a first message authentication code (MAC) associated with the first plaintext, and wherein generating the second index for the second plaintext is based at least in part on a second MAC associated with the second plaintext.

11. The method of claim 1, wherein the index value is a numeric value.

12. An apparatus for storing encrypted data, in a system comprising:
    a processor;
    memory in electronic communication with the processor; and
    instructions stored in the memory and operable, when executed by the processor, to cause the apparatus to:
        store a first ciphertext associated with a first plaintext in a data field of a database;
        store a second ciphertext associated with a second plaintext in the data field, wherein the first plaintext and the second plaintext are different;
        generate a first index for the first plaintext and a second index for the second plaintext using an indexing function, wherein an index value of the first index and an index value of the second index are the same;
        receive a query request message including a request to filter on the first plaintext for the data field;
        determine a set of index values associated with the first plaintext using the indexing function, wherein the set of index values comprises the index value of the first index and the second index, wherein determining the set of index values is based at least in part on the query request message and wherein the indexing function implements collisions to generate the same index value for the first index and the index value for the second index using the first plaintext and the second plaintext different from the first plaintext; and
        identify, for a set of ciphertexts stored in the data field, all indexes with index values included in the determined set of index values.

13. The apparatus of claim 12, wherein the instructions are further executable by the processor to:
    decrypt the first ciphertext and the second ciphertext based at least in part on identifying that the index value of the first index and the second index is included in the determined set of index values.

14. The apparatus of claim 12, wherein the instructions are further executable by the processor to:
    adjust a selectivity of the indexing function, wherein the selectivity comprises a ratio between a quantity of the identified indexes and a total quantity of the set of ciphertexts stored in the data field.

15. A non-transitory computer readable medium storing code for storing encrypted data, the code comprising instructions executable by a processor to:
    store a first ciphertext associated with a first plaintext in a data field of a database;
    store a second ciphertext associated with a second plaintext in the data field, wherein the first plaintext and the second plaintext are different;
    generate a first index for the first plaintext and a second index for the second plaintext using an indexing function, wherein an index value of the first index and an index value of the second index are the same;
    receive a query request message including a request to filter on the first plaintext for the data field;
    determine a set of index values associated with the first plaintext using the indexing function, wherein the set of index values comprises the index value of the first index and the second index, wherein determining the set of index values is based at least in part on the query request message and wherein the indexing function implements collisions to generate the same index value for the first index and the index value for the second index using the first plaintext and the second plaintext different from the first plaintext; and
    identify, for a set of ciphertexts stored in the data field, all indexes with index values included in the determined set of index values.

16. The non-transitory computer-readable medium of claim 15, wherein the instructions are further executable by the processor to:
    decrypt the first ciphertext and the second ciphertext based at least in part on identifying that the index value of the first index and the second index is included in the determined set of index values.

17. The non-transitory computer-readable medium of claim 15, wherein the instructions are further executable by the processor to:
    adjust a selectivity of the indexing function, wherein the selectivity comprises a ratio between a quantity of the identified indexes and a total quantity of the set of ciphertexts stored in the data field.

\* \* \* \* \*